(12) United States Patent
Hiramatsu et al.

(10) Patent No.: US 6,710,592 B2
(45) Date of Patent: Mar. 23, 2004

(54) HIGH-PRECISION SENSOR CIRCUIT FOR SMALL-DIAMETER CYLINDRICAL CONTACT DISPLACEMENT DETECTOR

(75) Inventors: Naruaki Hiramatsu, Kyoto (JP); Kimihiko Nakamura, Kyoto (JP); Tadashi Itou, Osaka (JP); Satoshi Kuramoto, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/161,576

(22) Filed: May 31, 2002

(65) Prior Publication Data

US 2003/0006761 A1 Jan. 9, 2003

(30) Foreign Application Priority Data

Jun. 1, 2001 (JP) ........................................ 2001-166053
Jun. 1, 2001 (JP) ........................................ 2001-166692

(51) Int. Cl.[7] .............................. G01B 7/14; G01B 7/30
(52) U.S. Cl. ............................. 324/207.18; 324/207.12; 324/207.24
(58) Field of Search ....................... 324/207.18, 207.15, 324/207.19, 207.12, 202, 207.16, 207.24, 241, 754, 238, 240; 73/105, 104, 865.9; 340/870.35, 870.36; 335/168

(56) References Cited

U.S. PATENT DOCUMENTS 5,726,350 A * 3/1998 Tsuruta ..................... 73/105
5,777,468 A * 7/1998 Maher ................... 324/207.18
5,777,469 A * 7/1998 Hockey et al. ............. 324/240

* cited by examiner

*Primary Examiner*—N. Le
*Assistant Examiner*—Subhash Zaveri
(74) *Attorney, Agent, or Firm*—Beyer Weaver & Thomas LLP

(57) ABSTRACT

A displacement detector has a contact sensor incorporating a differential transformer and a circuit for adjusting the amplitude of the driving signal for driving a differential transformer of the sensor by feeding back as a standard signal the driving signal through an amplifier and an AC-DC converter as a standard signal. The sensor has a housing containing a mobile member. The mobile member has a shaft with a hole. An outer tubular body of a linear bush and a ball guide each have a hole, and a pin is inserted through these holes movably in the direction of movement of the mobile member such that the rotation of the mobile member is prevented.

12 Claims, 17 Drawing Sheets

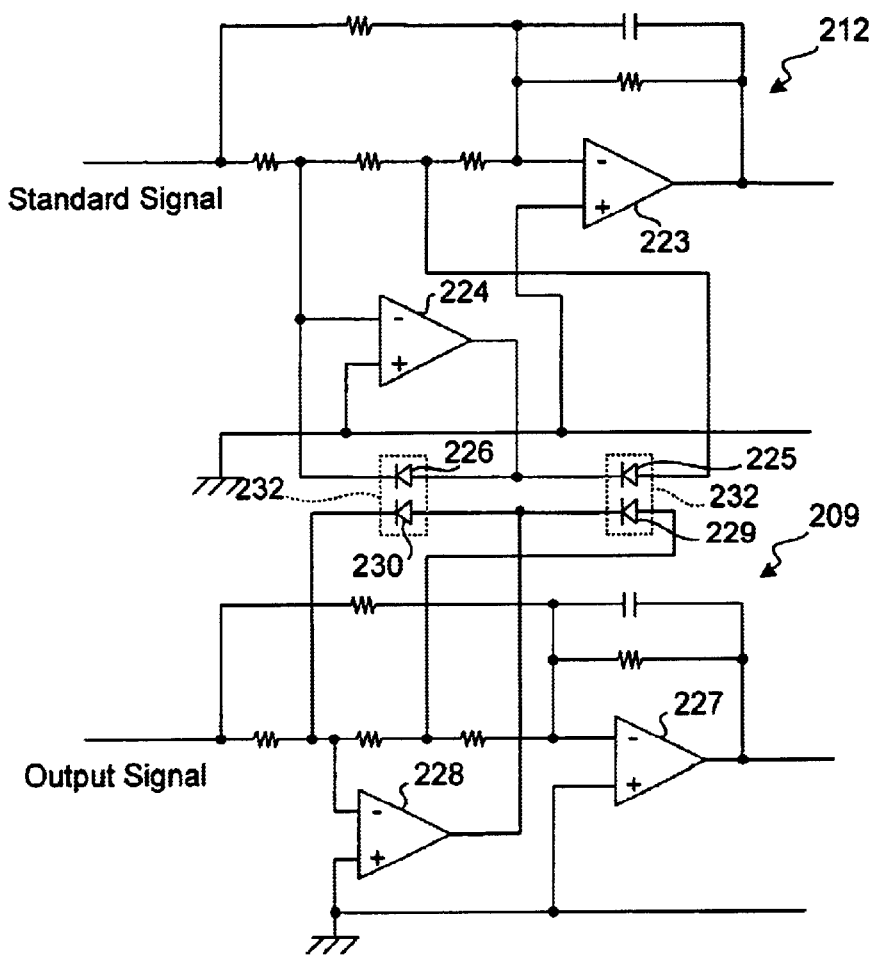
FIG. 5
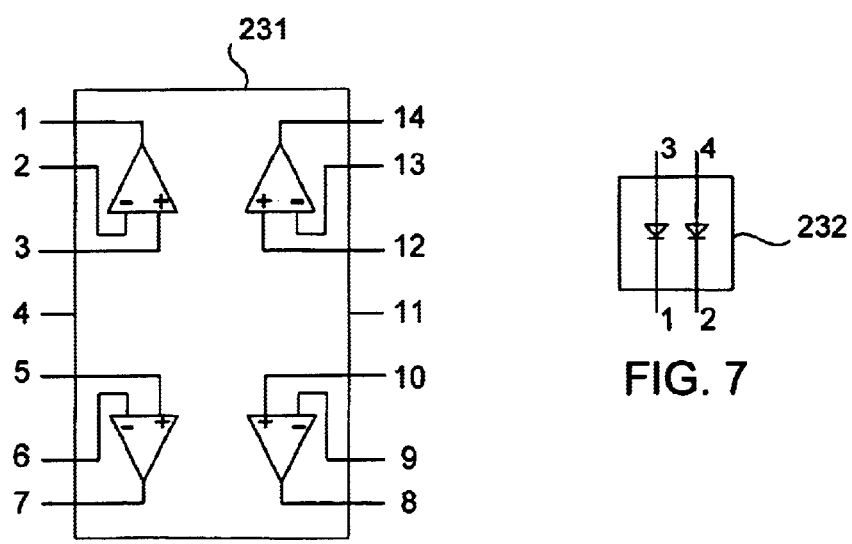
FIG. 6
FIG. 7

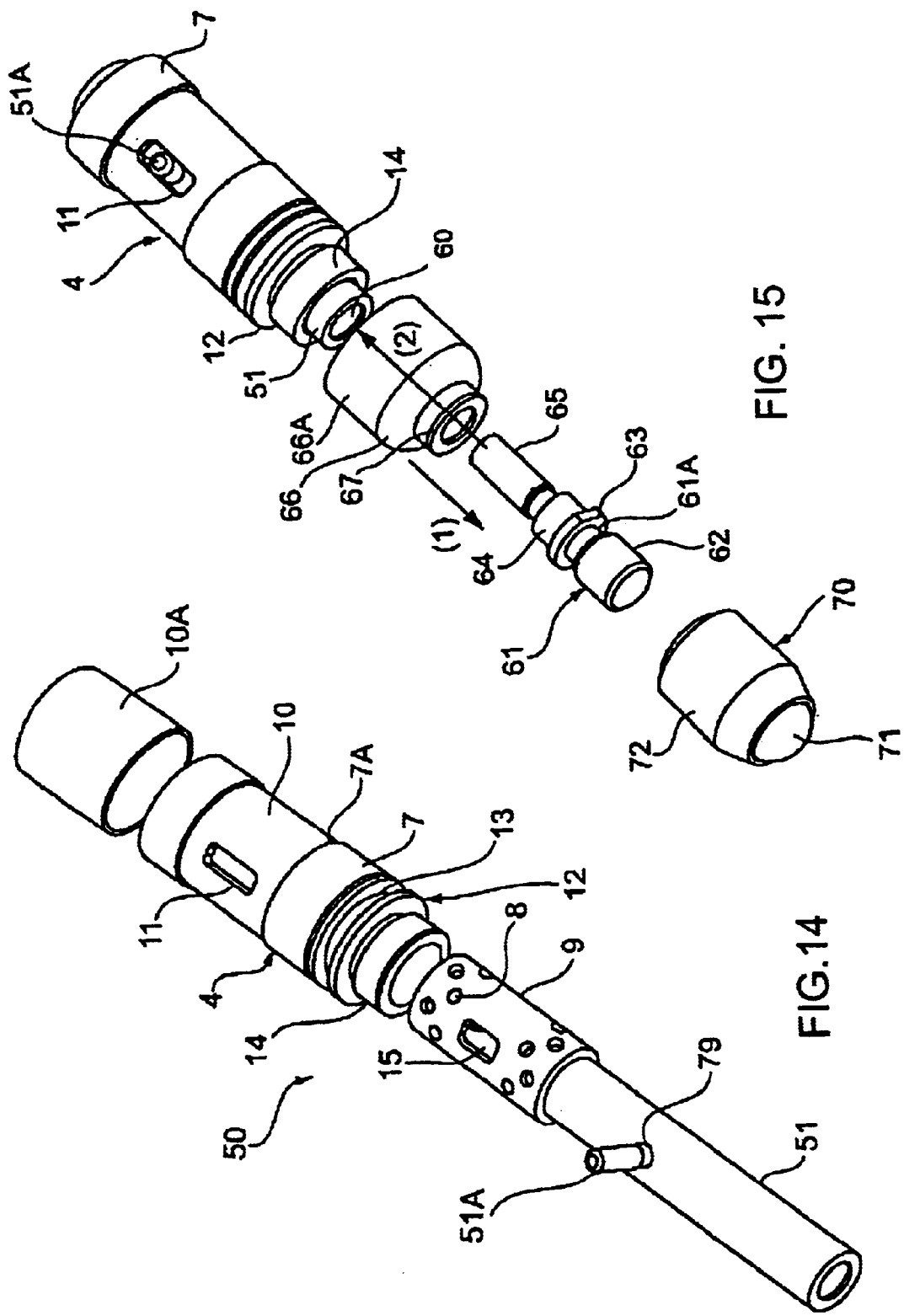

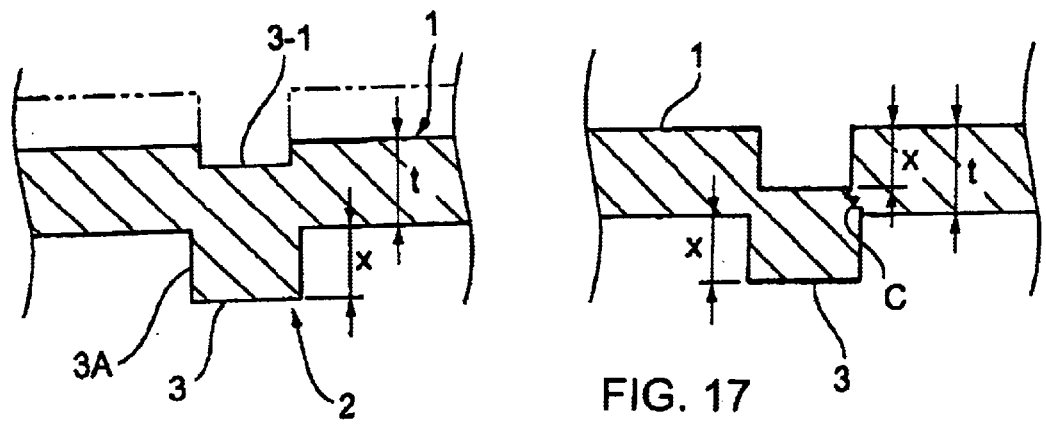
FIG. 16
FIG. 17
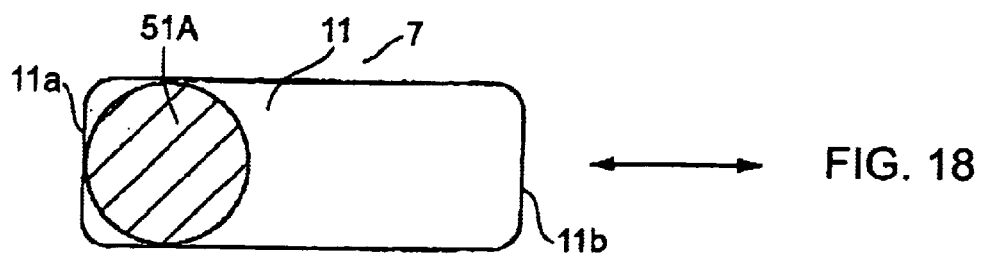
FIG. 18
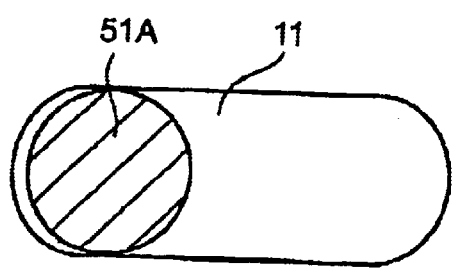
FIG. 19A
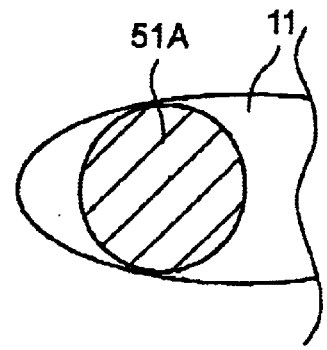
FIG. 19B

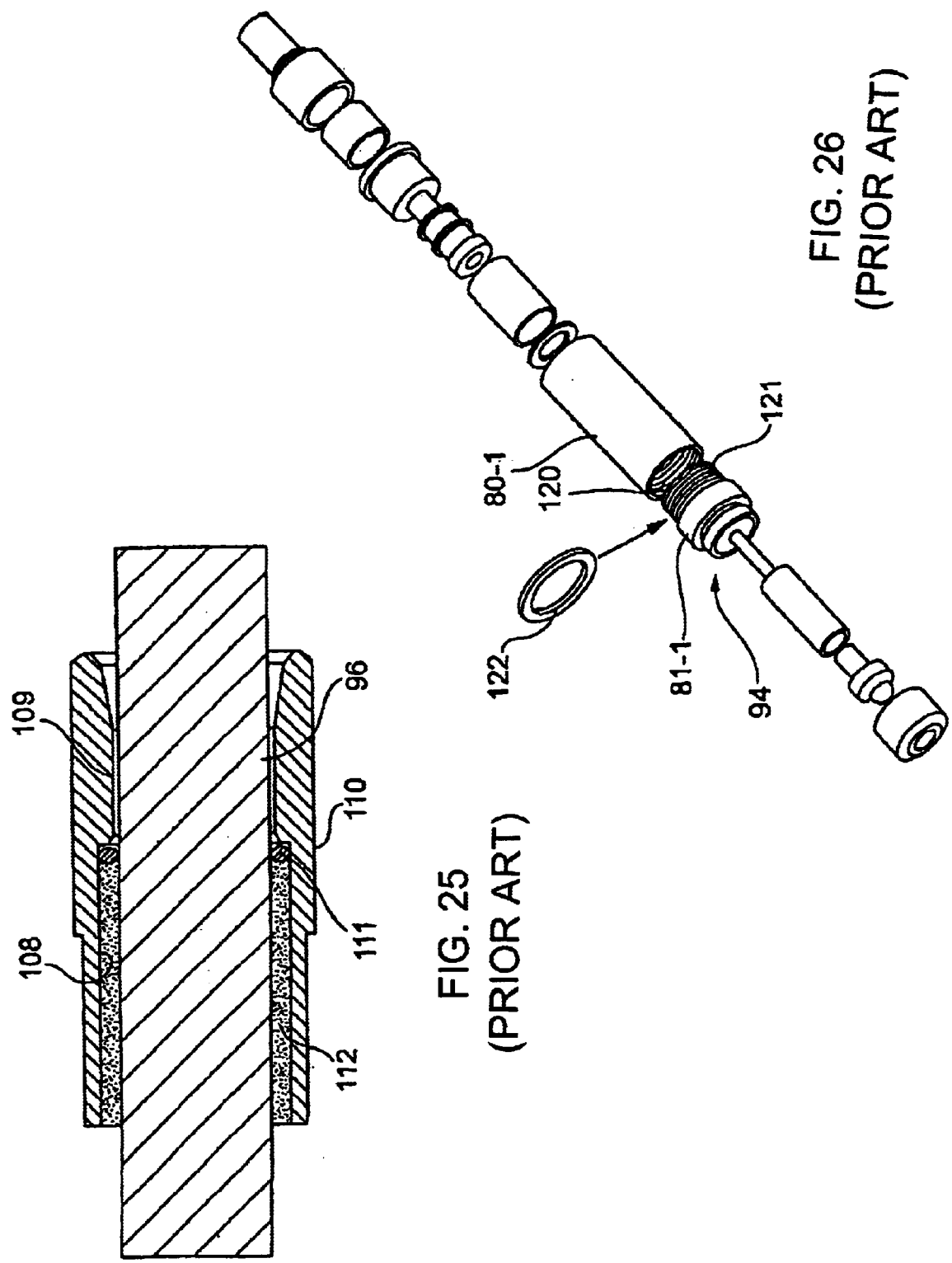

HIGH-PRECISION SENSOR CIRCUIT FOR SMALL-DIAMETER CYLINDRICAL CONTACT DISPLACEMENT DETECTOR

BACKGROUND OF THE INVENTION

This invention relates to a high-precision sensor circuit for a contact displacement detector for accurately measuring dimensions and shape of device components or assemblies at a factory, and more particularly to a contact displacement sensor incorporating a differential transformer and a circuit for forming a displacement detector incorporating such a sensor.

FIG. 28 shows the circuit structure of a prior art contact displacement detector with a sensor 201 incorporating a differential transformer 202 and a sensitivity-adjusting resistor 203. The differential transformer 202 has a mobile core (not shown) and two coils 204 and 205 disposed around this mobile core. These two coils 204 and 205 are connected in series and driven by an AC voltage provided as a driving signal from an oscillator 206 through an amplifier 207. Output signals are taken out from a junction point in between.

This displacement detector is a transducer of the half-bridge type. The inductance of the two coils 204 and 205 driven by an AC voltage is a function of the position of the mobile core. The inductive voltages generated in the two coils 204 and 205 are equal to each other if the mobile core is at the center of the two coils 204 and 205. If the mobile core is displaced from this center position, the inductive voltage of one of the coils 204 or 205 increases and that of the other coil 204 or 205 decreases. A contact member (not shown) for contacting the target object of measurement is attached to this mobile core and the sensor is adapted to detect the displacement of this contact member.

The output signal from the junction at the center of the two coils 204 and 205 is an AC output of which the amplitude changes according to the displacement of the mobile core. After being amplified by an amplifier 208, this output AC signal is subjected to a full-wave rectification process by an AC-DC converter 209 and inputted to the non-inversion input terminal of a differential amplifier 210. Another AC voltage applied from amplifier 207 to the differential transformer 202 is inputted to the inversion input terminal of this differential amplifier 210 through amplifier 211 and AC-DC converter 212 to serve as a standard signal. The differential amplifier 210 amplifies the standard signal and the output signal from the differential transformer 202 differentially and outputs a signal corresponding to the displacement of the mobile core.

According to this illustrated example, not only is the sensor 201 itself provided with a sensitivity-adjusting resistor 203, but the amplifier 208 for amplifying the output signal from the differential transformer 202 is provided with a gain-switching resistor 213 such that the gain of the amplifier 208 can be changed, depending on the kind of the sensor 201, that is, such that the same circuit can be used with sensors of different kinds with different ranges of measurement (or strokes).

According to this example, furthermore, a pull-down resistor 214 is connected to the output signal line of the differential transformer 202 and there is also provided a comparator 215 for comparing the output from the AC-DC converter 209 with a threshold value to provide a detection output. If there is a breakage in the sensor cable connected to the sensor 201, or when the wire for transmitting a signal for driving the sensor 201 is broken (as indicated by A1) or the sensor signal output line A2 is broken, for example, the AC voltage signal outputted from the sensor 201 is not communicated and becomes zero by the pull-down resistor 214 such that the breakage can be detected by the comparator 215. If the breakage is only in the grounding line, as shown by A3, the sensor driving signal is not divided by the coils 204 and 205 and hence the sensor driving signal is directly outputted. This, too, can be detected by the comparator 215.

For carrying out measurements with a high level of accuracy with such a prior art sensor, very small signals from the differential transformer must be taken out at a high level of stability and with a high S/N ratio. Moreover, the output from the amplifier 207 to become a standard signal must also be stable. For this purpose, an oscillator and an amplifier such as an operational amplifier with high accuracy and stability are required. For obtaining a high S/N ratio and stability, a dedicated IC incorporating an operational circuit for temperature compensation, etc. must be used, and this affects the production cost adversely.

Since different sensors have different sensitivities, furthermore, the gain of the amplifier 208 is adjusted by means of the gain-switching resistor 213. Thus, if a sensor with low sensitivity is used, the S/N ratio becomes lowered as the gain is increased. Although it is desirable to use processing systems having similar processing characteristics for the standard signal and the output signal from the differential transformer 202, the processing system for the output signals from the differential transformer 202 is different from that for the standard signal, being adapted to switch to change the gain. Thus, it is difficult to make the temperature characteristics of the components uniform and to place the components in a thermally well balanced manner.

Moreover, since the breakage of the sensor cable is detected on the basis of the output AC signal, if the inductance of the differential transformer 202 is increased in order to improve the sensitivity of the sensor 201, the output AC signal from the differential transformer becomes unstable due to the capacitive coupling between the signal lines at both ends of the coil 204 or 205 when there is a breakage in the sensor cable and the breakage may not be detected dependably. It may be attempted therefore to reduce the resistance of the pull-down resistor 214 in order to reduce the effect of the capacitive coupling but if the resistance of the pull-down resistor 214 is reduced, the linearity characteristic of the differential transformer 202 becomes adversely affected. A similar result is obtained even if a pull-up resistor is used instead of the pull-down resistor.

Another problem of prior art displacement sensors of this kind relates to their structure. If the diameter of a sensor is reduced from $\phi 8$ to $\phi 6$, for example, the sensor can be attached to a target object (such as a machine) more intimately and the target object can be made more compact. Since the weight of the mobile parts of the sensor must be reduced accordingly, the load to the sensor can be reduced and hence the sensor becomes usable for the measurement of an object which could not be measured because of its large load. When the diameter of a sensor is reduced from $\phi 8$ to $\phi 6$, however, it is not sufficient to merely reduce its linear dimensions to three quarters (0.6/0.8) of the original and to reduce the cross-sectional area by a factor of $(0.6/0.8)^2 = 0.56$. It cannot be ignored that stoppers for the rotation of a mobile component for driving the core member, for example, must retain their original function and capability. Moreover, the difficulty in assembly because of reduced size of components must be considered and the need for waterproofing between the mobile components for the core member becomes more important.

FIG. 23 shows the structure of an example of prior art displacement sensor, having a linear bush 81 and the bobbin assembly of a differential transformer 95 inside a housing 80. A mobile member 101 having a mobile shaft 91 and a core member 89 connected to this mobile shaft 91 is movable longitudinally inside this housing 80 through a linear bush 94. The core material 89 is inserted into the bobbin assembly of the differential transformer 95 to form the differential transformer 95. The mobile member 101 is biased by means of a spring member (not shown) such as a parallel coil spring with invariable coil diameter so as to protrude the tip of the mobile shaft 91 out of the housing 80 and a contact member 93 is formed at the protruding portion of the mobile shaft 91. The linear bush 94 is of a structure having inserted inside an outer tubular body 81 with an elongated hole 88 on its circumference a ball guide 84 with many balls 84a held on its circumference. A rotation-preventing pin 92 on the shaft 91 is inserted into the elongated hole 88 of the outer tubular body 81 so as to stop the rotation of the mobile member 101.

FIG. 24A shows another prior art displacement sensor, having a linear bush 94 and the bobbin assembly of a differential transformer 95 inside a housing 80. A mobile member 101 having a mobile shaft 91 and a core member 89 connected to this mobile shaft 91 is movable longitudinally inside this housing 80 through the linear bush 94. The core material 89 is inserted into the bobbin assembly of the differential transformer 95 to form the differential transformer 95. The mobile member 101 is biased by means of a spring member (not shown) such as a parallel coil spring with invariable coil diameter so as to protrude the tip of the mobile shaft 91 out of the housing 80 and a contact member 93 is formed at the protruding portion of the mobile shaft 91. A rotation-preventing member 102 on the mobile shaft 91 has a groove 102A formed extending in the axial direction of the housing 80. A metallic rotation-preventing guide pin 103 is pressed into a hole 80a in the housing 80 and into the groove 102A as shown in FIG. 24B to prevent the rotation of the mobile member 101.

FIG. 25 shows the structure for leading a cable out of the housing 80 in a sealed manner, including a cable-stopping member 110 having a resin-filling portion 108 and a cable-passing opening part 109. After a cable 96 is inserted into the opening part 109, an O-ring 111 is placed between the resin-filling portion 108 and the opening part 109, and the resin-filling portion 108 is filled with an epoxy resin material 112, and the cable-stopping member 110 is pressed into the backward end of the housing 80.

With a prior art displacement sensor structured as shown in FIG. 23, the rotation-preventing pin 92 is inserted into the elongated hole 88 on the outer tubular body 81 of the linear bush 94 in order to prevent the rotation of the mobile member 101. Thus, the elongated hole 88 must be formed on the outer tubular body 81 and burrs are left on the inner surface of the outer tubular body rubbed by the balls 84a. A work process for removing these burrs becomes necessary, and the construction and preparation of this linear bush becomes complicated. Such means for preventing the mobile member from rotating cannot be used directly with a displacement sensor as the latter is becoming miniaturized because the workability efficiency will be significantly affected. In particular, the distance of the displacement in the direction of the motion of the mobility becomes increased and the outer tubular body 81 of the linear bush 94 comes close to the differential transformer 95. Thus, the magnetic property of the outer tubular body 81 may come to adversely affect the characteristics of the differential transformer 95, causing the product quality and temperature characteristic to become unstable.

With a prior art displacement sensor structured as shown in FIG. 24A adapted to have a metallic guide pin 103 inserted into a groove, the pin 103 will slide inside the groove 102A as the mobile member 101 is moved, and this increases the friction between metals, making it difficult to reduce the force required for the operation. Since the housing 80 has a hole 80a for accepting the pin 103, waterproofing cannot be made and the device diameter cannot be reduced because the portion around the hole 80a must be made sufficiently thick. Additional problems are that the length in the mobile direction increases and the production cost of the housing 80 becomes higher. Since a parallel coil spring with invariable coil diameter is used for the mobile shaft 91, furthermore, the coil will rub against the neighboring components to cause friction and interference. Moreover, since the cable is fastened to the housing 80 by passing the cable 96 through the opening part 109 of the cable-stopping member 110, placing the O-ring 111 between the resin-filling portion 108 and the cable-passing opening part 109, filling the resin-filling portion 108 with the epoxy resin 112 and pressing the cable-stopping member 110 into the back end of the housing 80, there is a large variation in the strength and the cable cannot be kept flexible.

FIG. 26 shows still another prior art displacement sensor providing a housing 80-1 with a female screw part 120 and an outer tubular body 81-1 of a linear bush 94 with a male screw part 121, It is assembled with the male screw part 120 engaged with the female screw part 121 to tighten a flat packing member 122 in a watertight manner. Since it requires a height corresponding to the ridge portion of the male screw part 121, the sensor is prevented from being made compact. An adhesive may be used instead of screws, but this leaves the problem of dependability in the sealing.

FIG. 27 shows still another prior art displacement sensor assembled by inserting a rubber boot 123 onto a mobile shaft 125 from the side of a measurement piece 124. Since the mobile shaft 125 is provided with a male screw part 126 for attaching the measurement piece 124, the inner surface (sealing surface) of the sealing part 123a of the rubber boot 123 is easily damaged, and this again leaves the problem of dependability in the sealing.

SUMMARY OF THE INVENTION

It is therefore an object of this invention to provide a displacement detector capable of detecting displacements accurately.

It is another object of this invention to provide such a displacement detector which can be produced inexpensively.

It is still another object of this invention to provide a displacement detector capable of dependably detect a wire breakage.

It is therefore an object of this invention to provide a contact displacement sensor structured so as to be made compact while maintaining its original functions and capabilities.

A displacement detector embodying this invention may be characterized as comprising a differential transformer, driver means for generating a driving signal for driving the differential transformer, standard signal processing means for processing the driving signal and thereby outputting a standard signal, output signal processing means for processing signals outputted from the differential transformer, differential amplifier means for carrying out differential amplification of the standard signal and the output signal from the output signal processing means, and amplitude adjusting means for adjusting the amplitude of the driving signal to a constant value by feeding back the standard signal to the driver means. With a displacement detector thus characterized, a stable driving signal can be obtained for driving the differential transformer and a stable standard signal can be provided to the differential amplifier means. This is unlike a prior art displacement detector requiring expensive, highly stable components such as oscillator and amplifiers because an open-loop signal routine was employed.

Since the amplitude of the driving signal for driving the differential transformer is adjusted according to the kind of the differential transformer, or the sensitivity of the differential transformer, the S/N ratio does not drop as in the case of a prior art detector adapted to adjust the gain. Since the gain is not switched, the signal processing by the standard signal processing means and the output signal processing means can be made equal. As a result, the components can be arranged in a thermally balanced manner.

Since the amplitude adjusting means adjusts the amplitude of the driving signal such that it will take upon a value corresponding to the aforementioned standard value, the standard signal and the standard value become nearly equal, and similar merits as described above can results if the standard value instead of the standard signal is given to the differential amplifier means.

According to another embodiment of the invention, the standard signal processing means and the output signal processing means each comprise an amplifier circuit and an AC-DC converter, and at least either these amplifiers or these AC-DC converters are thermally coupled, for example, by being packaged together or by being placed appropriately. Thus, not only temperature variations in the standard signal processing means are automatically corrected according to this invention because the standard signal is fed back, temperature variations also become alike in the standard signal processing means and the output signal processing means because they are thermally coupled. Their variations can be cancelled together by the differential amplifier means on the downstream side, and a highly accurate detection becomes possible.

According to still another embodiment of the invention, an abnormal condition of the detector is detected on the basis of the level of a DC bias which is superimposed to the output signal from the differential transformer. In the case of a breakage in the sensor cable, the level of the DC bias superimposed to the output signal from the differential transformer becomes outside a specified range, and this makes it possible to detect a breakage in the cable. Even if the inductance of the differential transformer is high, such an abnormality can be reliably detected without being affected by the thermal coupling, and there is no need to reduce the resistance of a pull-down resistor or a pull-up resistor. A trouble in the driver means can also be detected similarly.

A displacement sensor embodying this invention may be characterized as comprising a linear bush and a mobile member inside a housing and rotation-preventing means for preventing rotation of the mobile member. The linear bush includes an outer tubular body extending in its axial direction and containing a holder which is movable in the axial direction of the outer tubular body. The mobile member has a mobile shaft supporting the core member of a differential transformer and is movable in the same axial direction, being biased outwardly by a spring. The outer tubular body of the linear bush and the holder inside the outer tubular body are each provided with a hole, and the mobile shaft of the mobile member includes a pin-accepting hole part. The rotation-preventing means comprises a rotation-preventing member such as a pin which is inserted movably through these holes in the outer tubular member and the holder and into the pin-accepting hole part. The outer tubular body of the linear bush is a tubular member to be attached to the inner surface of the housing when the linear bush is engaged with the housing and adhesively attached to the housing. The holder may comprise a ball guide holding many balls thereon.

With a structure as described above, the rotation-preventing means can be contained inside the main body of the sensor such that the sensor can be made compact and shorter. It also helps to increase the strength of the mobile shaft and its production becomes easier.

In another aspect of the invention, the housing has protrusions formed thereon, protruding in the inward direction towards its interior, each protrusion has a stopping surface perpendicular to the axial direction of the sensor, and the housing includes a stopper having an outer surface with flat parts and a contact surface which is at one end of these flat parts and is also perpendicular to the axial direction. These protrusions are positioned at the flat parts around the stopper and the contact surface and the stopping surface contact each other to position the stopper and to prevent the stopper from rotating. With the sensor thus structured, the stopper can be affixed to the housing, positioned and prevented from rotating as the stopper is inserted inside the housing with the protrusions positioned at the flat parts and the stopping surface and the contact surfacing contacting each other.

These protrusions are produced according to this invention by punching the housing inward by the so-called "punch-stretch forming method" and grinding its outer surface areas in a centerless grinding process to reduce the thickness of the housing while maintaining a specified amount of protrusion. By such a method, protrusions with a specified height can be produced even if the material of the housing is relatively thick and since the housing is made thinner, the sensor can be made more compact accordingly.

The displacement sensor embodying this invention may be so structured that both the housing and the mobile member have two (first and second) stopper parts for preventing the aforementioned rotation-preventing member from hitting a near-by component and becoming thereby deformed. The stopper parts are so positioned that as the spring is stretched as much as possible until the first stopper parts come to contact each other (the spring being at the "stretched limit position"), there is a finite interval between the rotation-preventing member and one of the end parts of the holes into which the rotation-preventing member is inserted and that as the spring is pushed in and contracted as much as possible until the two second stopper parts come to contact each other (the spring being then at the "pushed-in position"), there is similarly another finite interval between the rotation-preventing member and the other of the end parts of the same holes. These two first stopper parts may be formed respectively on the outer tubular body of the linear bush and the stopper, and the first and second stopper parts of the mobile member may be formed on a core shaft. With stopper parts thus formed, the rotation-preventing means does not hit either the front or back end part of the elongated hole in which it slides as the mobile member is moved by stretching or contracting the spring in either direction. Thus, the rotation-preventing means is not deformed.

According to a preferred embodiment, a conic coil spring is used, supported between the stopper and the core shaft and the core shaft includes a tapered part for avoiding interference with this conic spring. Thus structured, the conic spring is not interfered by neighboring components even if the sensor is made compact as a whole.

The mobile shaft and a holder for the contact member (the "contact-member holder") may be realized as separate components, and a rubber boot is attached by engaging its front and back end parts respectively with a front boot holder on the contact-member holder and a back boot holder on an end cap with which the outer tubular member is provided. The contact-member holder is thus attached to the rubber boot, and the contact-member holder is connected to the rubber boot. In this manner, the inner surface of the rubber boot is not damaged and the end cap makes the structure even more reliably watertight.

Where a cable is connected to the sensor, a cable cap of a synthetic resin material is integrally formed with the cable and engaged with a back end part of the housing such that the cable is pulled out of the back end part of the housing. Polyester elastomer may be used for this purpose. Since the cable-holding part thus formed is not a separate component of the sensor, the total number of the constituent parts is reduced and the production cost can also be reduced. Furthermore, the cable can be made more flexible.

In order to attach the cable cap to the housing in a watertight manner, a groove is formed on the cable, filled with an adhesive. A protrusion is formed in the groove such that it will contact the inner surface of the housing as the cable cap is attached to the housing and the adhesive is sealed inside.

BRIEF DESCRIPTION OF THE DRAWINGS

FIG. 5 is a circuit diagram of portions of the AC-DC converters of FIG. 4.

FIG. 6 shows thermally coupled operational amplifiers.

FIG. 7 shows a thermally coupled diode array.

FIG. 14 is an exploded diagonal view of the rotation-preventing means.

FIG. 15 is an exploded diagonal view for showing how the rubber boots of the displacement sensor of FIG. 8 is assembled.

FIG. 16 is a sectional view of a stopper on the housing.

FIG. 17 is a sectional view of a stopper developing a crack.

FIG. 18 is a plan view of the hole for stopping rotation in the displacement sensor of FIG. 8.

FIGS. 19A and 19B are plan views of holes not according to the present invention for stopping rotation.

FIG. 25 is a sectional view of the sealing structure of the cable portion of a prior art displacement sensor.

FIG. 26 is a diagonal view of a portion of a prior art displacement sensor where its housing and linear bush are connected.

DETAILED DESCRIPTION OF THE INVENTION

Embodiments of this inventions are described next with reference to drawings.

Figure 1:
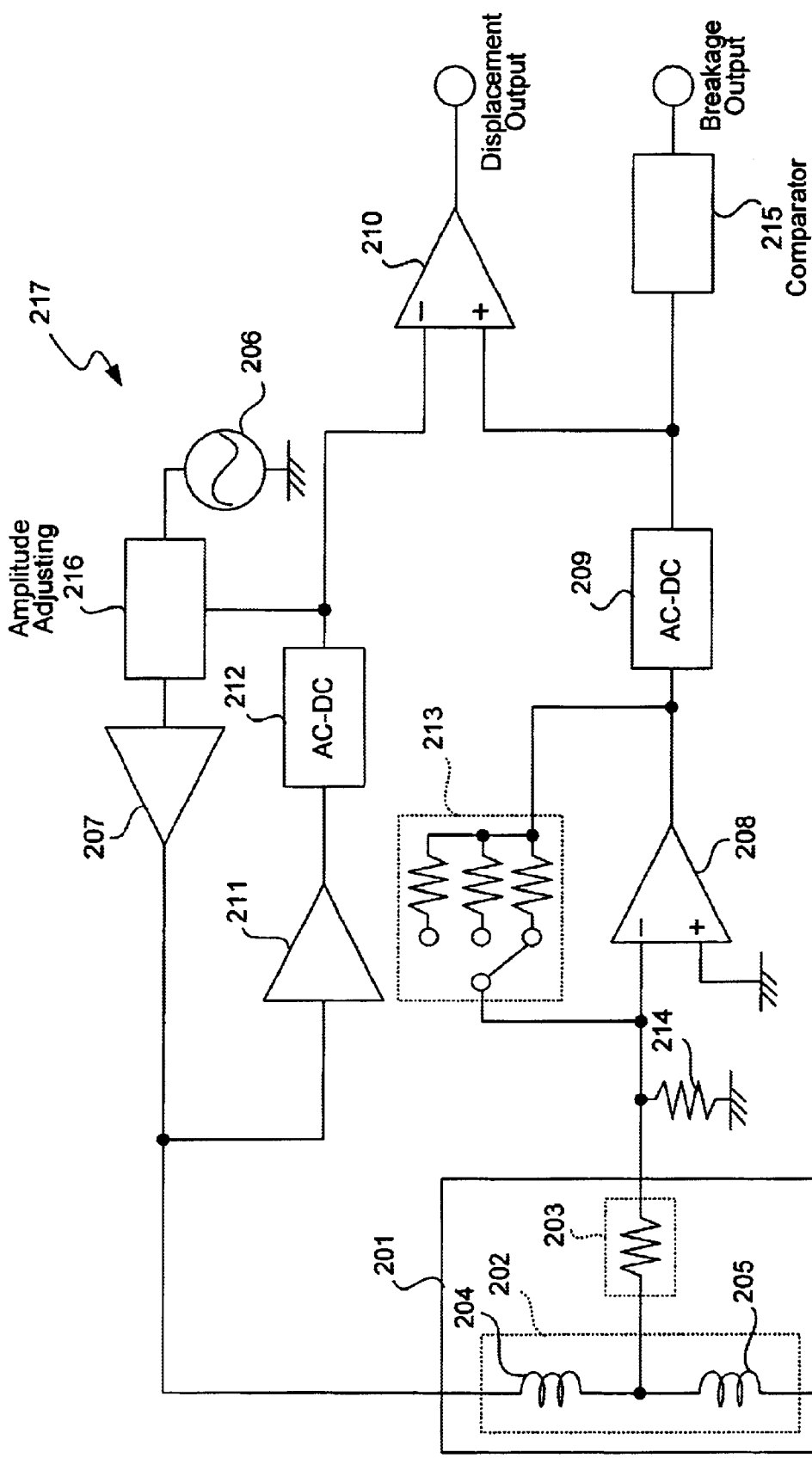
FIG. 1 is a circuit diagram of a displacement detector embodying the invention.

FIG. 1 shows the structure of a displacement detector 217 embodying the invention. Some of the components of this detector 217 are substantially the same as those explained above with reference to FIG. 28 and will be indicated by the same numerals for the convenience of disclosure.

In FIG. 1, numeral 201 again indicates a sensor forming the displacement detector 217 of this invention, connected through a sensor cable and including a differential transformer 202 and a sensitivity-adjusting resistor 203. The differential transformer 202 has a mobile core (not shown) and two coils 204 and 205 disposed around this mobile core. These two coils 204 and 205 are connected in series and driven by an AC voltage provided as a driving signal from an oscillator 206 through an amplifier 207. Output signals are taken out from a junction point in between. The oscillator 206 and the amplifier 207 together form a "driver means" for driving the differential transformer 202.

This displacement detector 217 is a transducer of the half-bridge type. The inductance of the two coils 204 and 205 driven by an AC voltage is a function of the position of the mobile core. The inductive voltages generated in the two coils 204 and 205 are equal to each other if the mobile core is at the center of the two coils 204 and 205. If the mobile core is displaced from this center position, the inductive voltage of one of the coils 204 or 205 increases and that of the other coil 204 or 205 decreases. A contact member (not shown) for contacting the target object of measurement is attached to this mobile core for detecting the displacement of this contact member.

The output signal from the junction at the center of the two coils 204 and 205 is an AC output of which the amplitude changes according to the displacement of the mobile core. After being amplified by an amplifier 208, this output AC signal undergoes a full-wave rectification process by an AC-DC converter 209 and is inputted to the non-inversion input terminal of a differential amplifier 210. The amplifier 208 and the AC-DC converter 209 together form an "output signal processing means" for processing the output signals from the differential transformer 202.

Another AC voltage applied from amplifier 207 to the differential transformer 202 is inputted to the inversion input terminal of this differential amplifier 210 through amplifier 211 and AC-DC converter 212 to serve as a standard signal. The amplifier 211 and the AC-DC converter 212 together form a "standard signal processing means" for outputting the standard signal by processing the driving signal.

The differential amplifier 210 amplifies the standard signal and the output signal from the differential transformer 202 differentially and outputs a signal corresponding to the displacement of the mobile core.

In this example, not only is the sensor 201 itself provided with a sensitivity-adjusting resistor 203, but the amplifier 208 for amplifying the output signal from the differential transformer 202 is provided with a gain-switching resistor 213 such that the gain of the amplifier 208 can be changed, depending on the kind of the sensor 201, that is, such that the same circuit can be used with sensors of different kinds with different ranges of measurement (or strokes). In this example, furthermore, a pull-down resistor 214 is connected to the output signal line of the differential transformer 202 and there is also provided a comparator 215 for comparing the output from the AC-DC converter 209 with a threshold value to provide a detection output.

Figure 28:
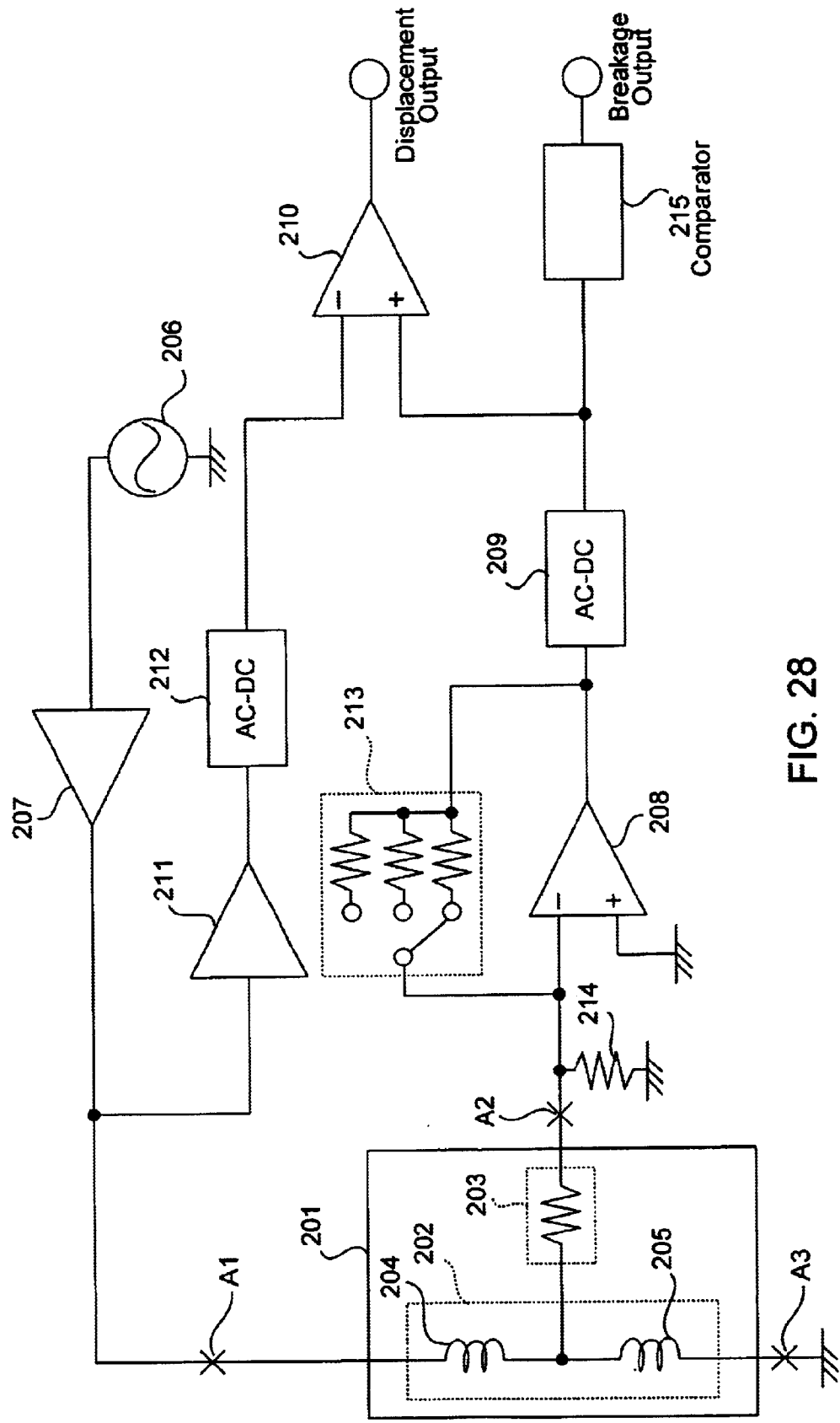
FIG. 28 is a circuit diagram of a prior art displacement detector.

Unlike the prior art displacement detector described with reference to FIG. 28, the example of displacement detector 217 shown in FIG. 1 includes an amplitude adjusting means 216 for adjusting to make uniform the amplitude of the AC voltage for driving the differential transformer 202 by feeding back the standard signals from the AC-DC converter 212 of the standard signal processing means to the driver means. This is for the purpose of making it possible to detect displacement with a high degree of accuracy and also stabilizing the output from the amplifier 207 serving as the standard signal for the differential amplifier 210 even if expensive kinds of oscillator, amplifier and dedicated IC are not used. This amplitude adjusting means 216 stores a standard value internally and includes an amplitude adjusting circuit for adjusting the amplitude of the AC voltage from the oscillator 206 such that the standard signal from the AD-DC converter 212 will approach this standard value.

With the amplitude of the driving signal provided to the differential transformer 202 thus maintained at a constant value by a feedback control, not only can the differential transformer 202 be operated by a stable driving signal, the standard signal provided to the differential amplifier 210 is also stabilized. Thus, according to this invention, accurate detection is possible even with an inexpensive displacement detector. This is in contrast to prior art displacement detectors which process signals by an open-loop routine and hence require accurate and highly stable oscillator and amplifier such as operational amplifier. Even the effects of temperature variations are only on the standard value of the amplitude adjusting circuit and hence there is no need to additionally provide any circuits for temperature compensation.

Figure 2:
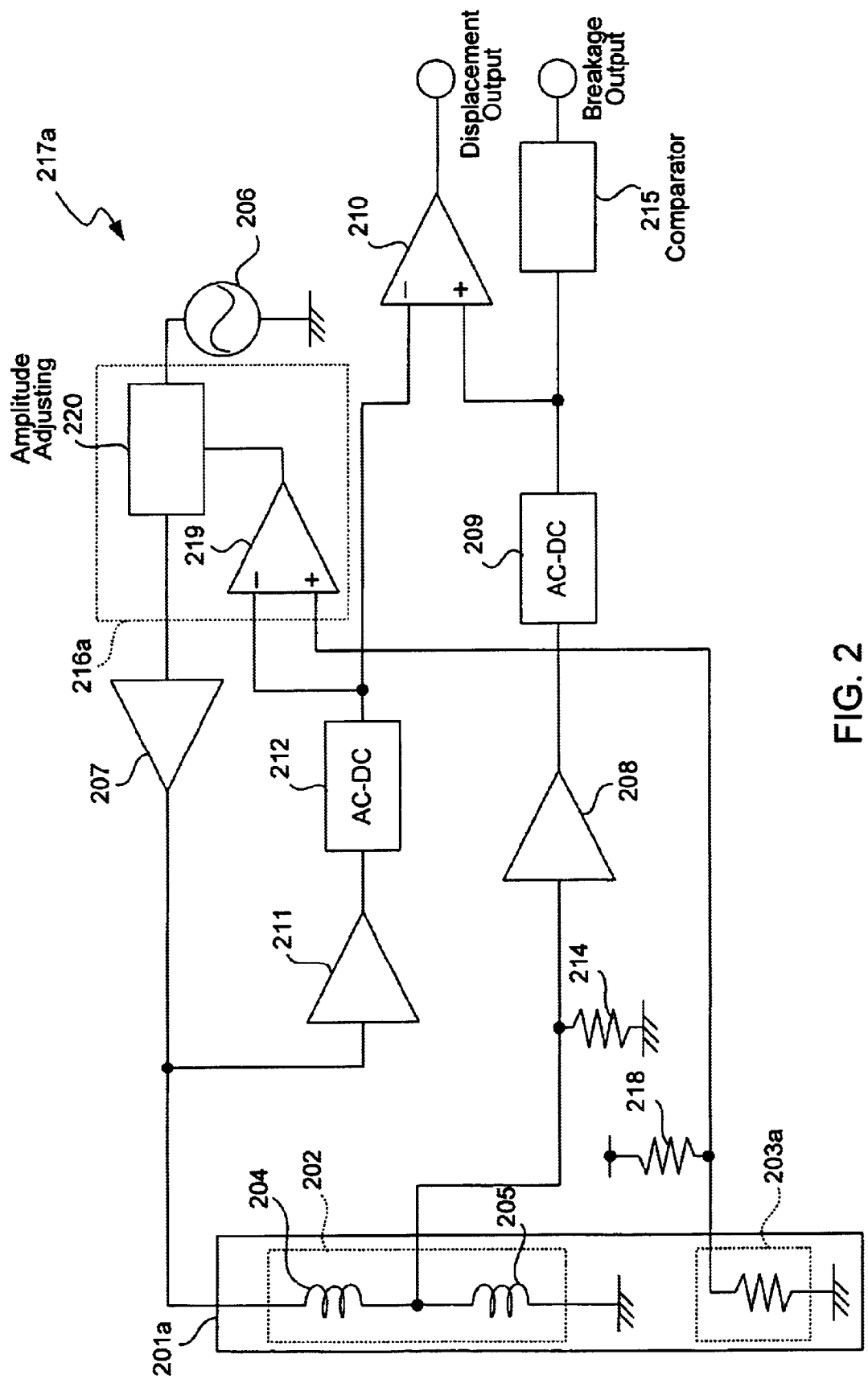
FIGS. 2, 3 and 4 are circuit diagrams of other displacement detectors embodying the invention.

FIG. 2 shows the structure of another displacement detector 217a embodying the invention, indicating like components by the same numerals as in FIG. 1. Unlike the first embodiment characterized as switching the gain of the amplifier 208 by means of the gain-switching resistor 213 according to the kind of the sensor 201, the second embodiment is characterized as switching the standard voltage of an amplitude adjusting means 216a according to the kind of the sensor 201a.

Explained more in detail, the sensor 201a in this example is provided with a sensitivity-adjusting resistor 203a, separate from the differential transformer 202, such that the divided voltage by this sensitivity-adjusting resistor 203a and another resistor 218 is provided to an amplitude-adjusting means 216a as the standard voltage. This standard voltage and the standard signal from the AC-DC converter 212 are compared by an operational amplifier 219, and an amplitude-adjusting circuit 220 adjusts the amplitude of the driving signal such that this difference will disappear.

In summary, according to the second embodiment of the invention, the amplitude of the driving signal to the differential transformer 202 is adjusted according to the kind of the sensor 201a, that is, the sensitivity of the sensor 201a. Thus, the change in the S/N ratio is reduced, and a higher S/N ratio can be obtained even with a sensor with a low sensitivity than by switching the gain of the amplifier.

Since the gain-switching resistor 213 of FIG. 1 is dispensed with, the processing by the output signal processing means with the amplifier 208 and the AC-DC converter 209 become equivalent to that by the standard signal processing means with the amplifier 11 and the AC-DC converter 212. This makes it easier to regulate the temperature characteristics of the components or to arrange the components in a thermally balanced manner. As will be explained below, variations in these means may be made equal such that they can be cancelled together by means of the differential amplifier 210. This can further improve the accuracy of displacement detection. In the above, the sensitivity-adjusting resistor 203 and the resistor 218 for dividing voltage may be disposed in the connector for connecting the sensor or in the detector 217a. In other respects, the second embodiment is the same as the first embodiment.

Figure 3:
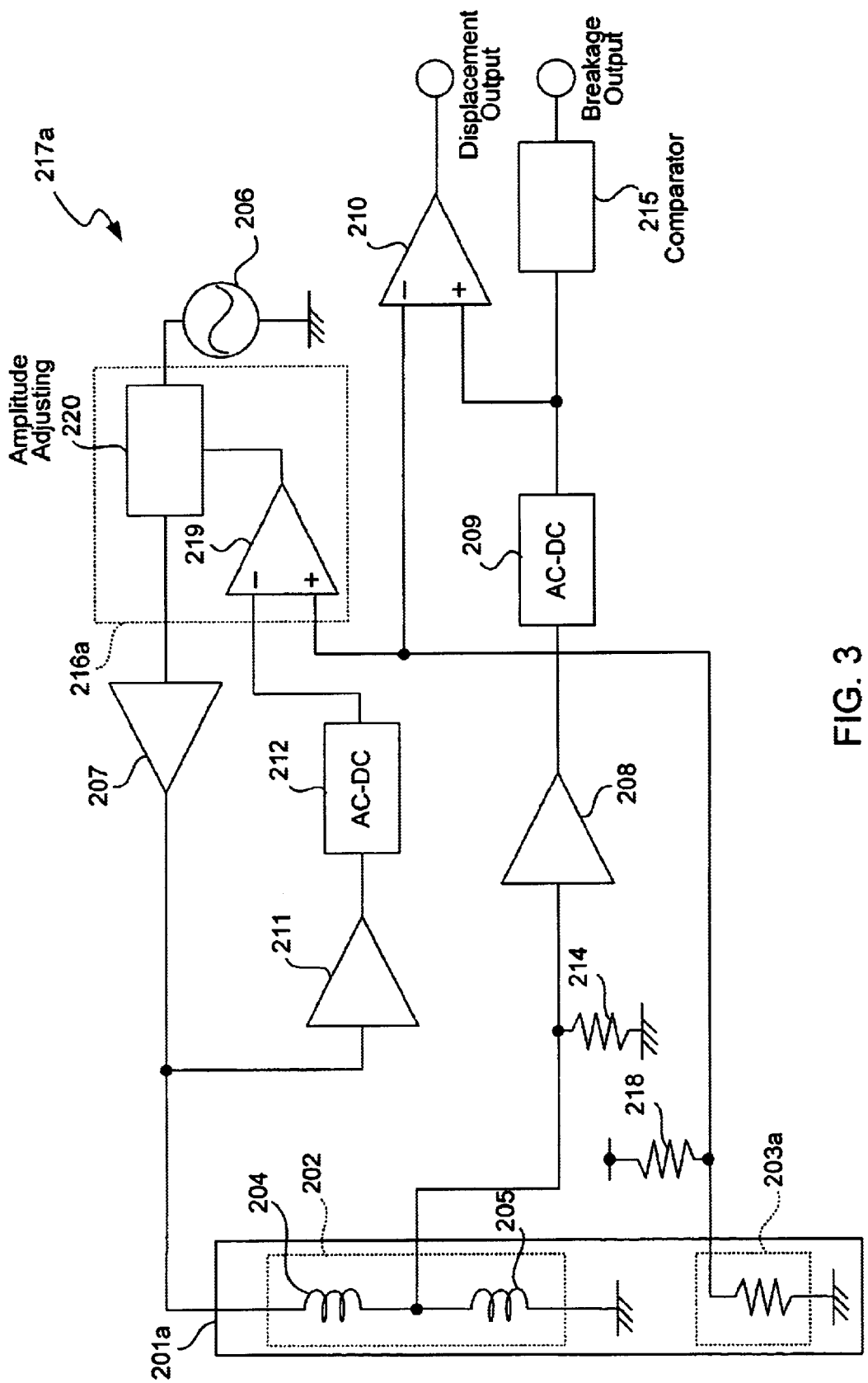

Since the amplitude-adjusting means 16a functions so as to adjust the amplitude of the driving signal and to make the difference disappear between the standard voltage and the signal from the AC-DC converter 212, the standard voltage and the standard signal from the AC-DC converter 212 become equal. Thus, as a variation, the standard voltage may be inputted to the differential amplifier 210 instead of the standard signal from the AC-DC converter 212, as shown in FIG. 3. Similarly, with reference to FIG. 1, the internal standard voltage of the amplitude adjusting means 216 may be inputted to the differential amplifier 210 instead of the standard signal from the AC-DC converter 212.

Figure 4:
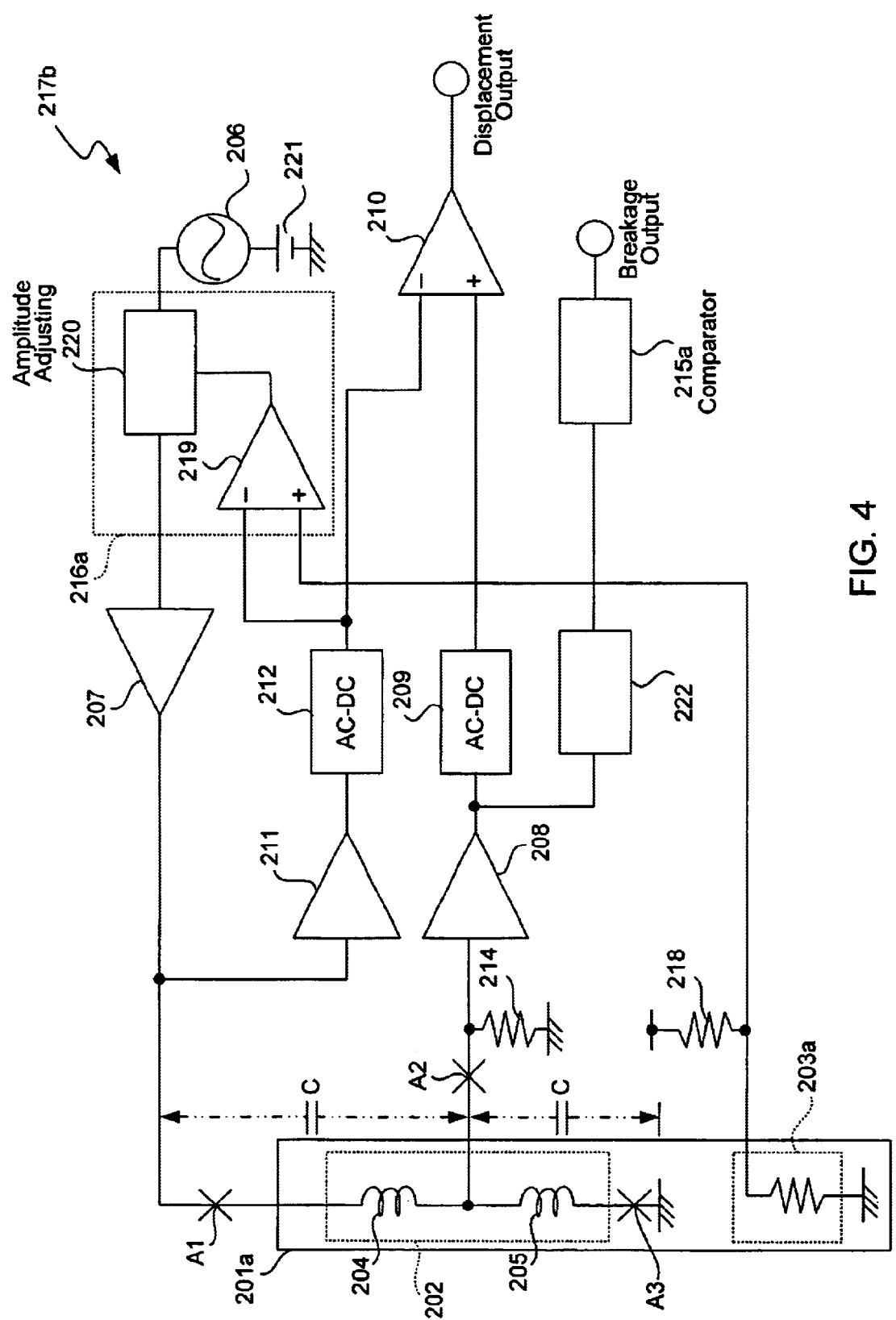

FIG. 4 shows the structure of still another displacement detector 217b, indicating like components by the same numerals. This embodiment is characterized as superimposing a DC bias onto the AC voltage from the oscillator 206 to become the driving signal by means of a DC bias superimposing circuit 221, using a low pass filter 222 to separate the DC bias superimposed onto the output signal from the differential transformer 202 given from the amplifier 208, and detecting a breakage in the sensor cable or a trouble in the driving means by using the comparator 215a on the basis of the DC bias level. This is in contrast with the embodiments described above adapted to detect a breakage in the sensor cable, etc. on the basis of the AC output signal from the differential transformer 202. In the example illustrated, a detector means for detecting an abnormality is comprised of the low pass filter 222 and the comparator 215a.

By this example, a breakage in the sensor cable, for example, can be detected by the comparator 215a because the level of the DC bias superimposed onto the output signal from the differential transformer 202 goes out of a specified range. If a breakage occurs at A1 on the side of the sensor driving signal or at A2 on the sensor output signal line, the sensor output with the DC bias superimposed is not communicated and it becomes 0V because of the pull-down resistor 214. The breakage can thus be detected by the comparator 215a. If the breakage is only on the GND side of the sensor as indicated by A3, the sensor driving signal is not divided by the coils 204 and 205 and is directly outputted. The level of the DC bias becomes higher than a specified level, and this is detected by the comparator 215a. If the driver means develops a trouble, too, the level of the DC bias superimposed onto the output signal becomes outside a specified range such that the trouble can be detected.

Since a feed-back control is carried out, like the examples described above, a control is effected when there is an abnormality developed in the driver means and its output changes such that this change will be corrected. Although troubles in the driver means have been difficult to detect, the level of the superimposed DC bias is monitored according to this example such that such an abnormality can also be detected as an accident.

If the inductance of the differential transformer 202 is increased in a prior art example, the AC output signal from the differential transformer 202 becomes unstable when there is a breakage in the sensor cable due to the capacitive coupling C developed between the signal lines at both ends of the coil 204 or 205 as shown in FIG. 4. In the present example, by contrast, there is no effect of such capacitive coupling because the breakage is detected on the basis of the DC bias and hence the breakage can be detected reliably. Thus, there is no need to decrease the resistance of the pull-down resistor 214 and the linearity characteristic of the differential transformer 202 is not adversely affected. The same holds when a pull-up resistor is used instead of the pull-down resistor 214.

In this example, like the second embodiment described above, the thermal characteristics of the components of the output signal processing means comprising the amplifier 208 and the AC-DC converter 209 and that of the standard signal processing means comprising the amplifier 211 and the AC-DC converter 212 are matched, their components are arranged by taking their thermal balance into consideration, or thermal couplers are used such that variations in these processing means will become equal and they can be cancelled by the differential amplifier 210.

The structure of thermal couplers is explained next with reference to FIG. 5 which is a circuit diagram of the AC-DC converters 12 and 9 respectively of the standard signal processing means and the output signal processing means. The AC-DC converter 212 of the standard signal processing means comprises not only two operational amplifiers 223 and 224 but also two rectifying diodes 225 and 226. The AC-DC converter 209 of the output signal processing means similarly comprises two operational amplifiers 227 and 228 and two rectifying diodes 229 and 230. These four operational amplifiers 223, 224, 227 and 228 may be arranged in a package 231 as shown in FIG. 6 and each pair of these diodes 225 with 229 and 226 with 230 may be formed as a diode array 232, as shown in FIG. 7.

Although an example was shown for thermally coupling the AC-DC converters 209 and 212, it now goes without saying that thermal coupling may be effected between the amplifiers 208 and 211. Although examples were explained above for the measurement of the size or the shape of a target object, they can also be used for measuring the displacement of a diaphragm and to thereby detect a pressure.

In summary, according to this invention, the amplitude of driving signal for driving the differential transformer is controlled so as to take upon a fixed value by means of a feed-back control. Thus, expensive components with high stability are not required, unlike the prior art examples relying upon an open-loop control, and detection of displacements with high accuracy becomes possible even with the use of relatively inexpensive components.

Figure 8:
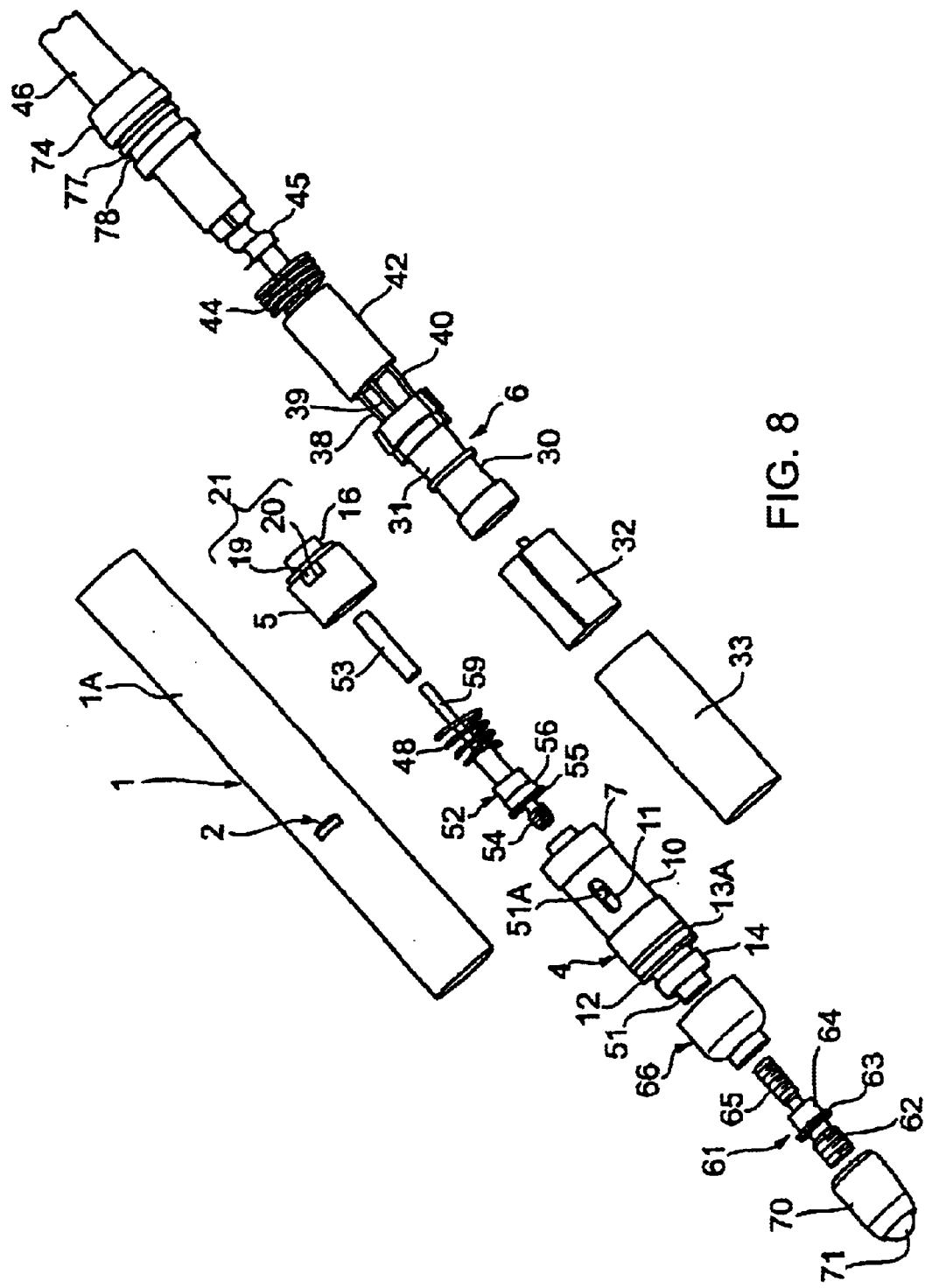
FIG. 8 is an exploded diagonal view of a displacement sensor embodying this invention.

Next, the structure of a displacement sensor embodying this invention is explained with reference to FIG. 8 which is its exploded diagonal view, FIG. 9 which is its vertical sectional view, FIG. 10 which is a sectional view of its tip part, FIG. 11 which is a sectional view of its center part, FIG. 12 which is a side view of its core shaft, and FIG. 13 which is a sectional view of its backward part.

With reference to FIGS. 8–13, the displacement sensor has a tubular housing 1 made of stainless steel having a plurality of stoppers 2 formed around its peripheral surface 1A at equal intervals at its center part. As shown in FIG. 16, these stoppers 2 are formed as protrusions 3 towards the center of the housing 1. These protrusions 3 may be made by a so-called punch-stretch forming method using a punch and a die (not shown). If the height of protrusion is x and the thickness of the housing 1 is t, the housing 1 will easily develop a crack C as shown in FIG. 17 unless x<t/2. Thus, as shown in FIG. 16 by dotted lines, a material with thickness greater than t is punched by a distance of x and then the outer surface is abraded by a centerless grinding process such that the unsightly indentations formed by the punching will become less conspicuous. The front surface 3A of the protrusion 3 serves as the stopping surface, or contact surface.

Figure 9:
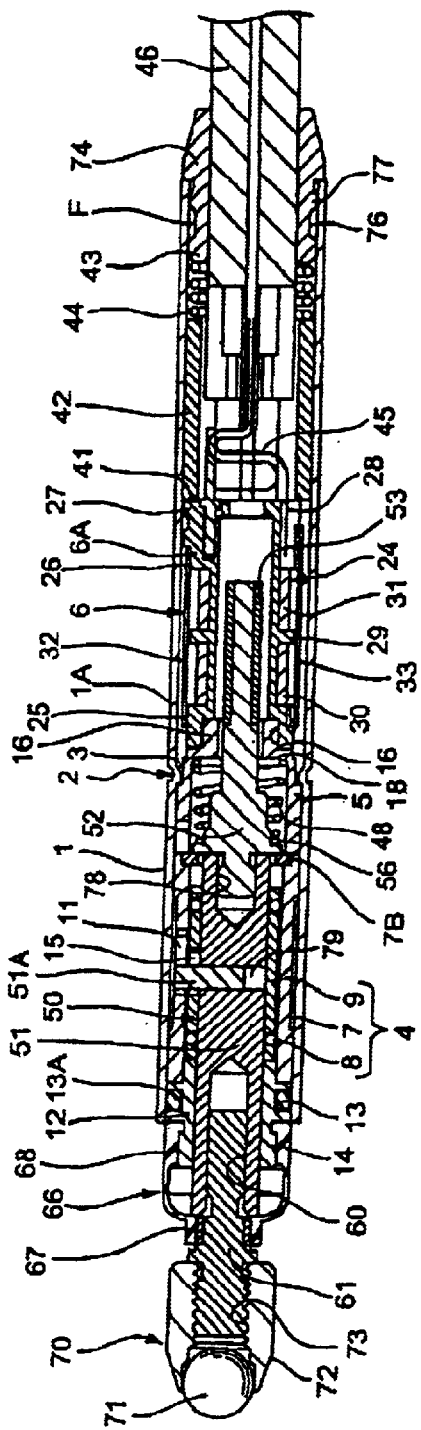
FIG. 9 is a vertical sectional view of the displacement sensor of FIG. 8.
Figure 13:
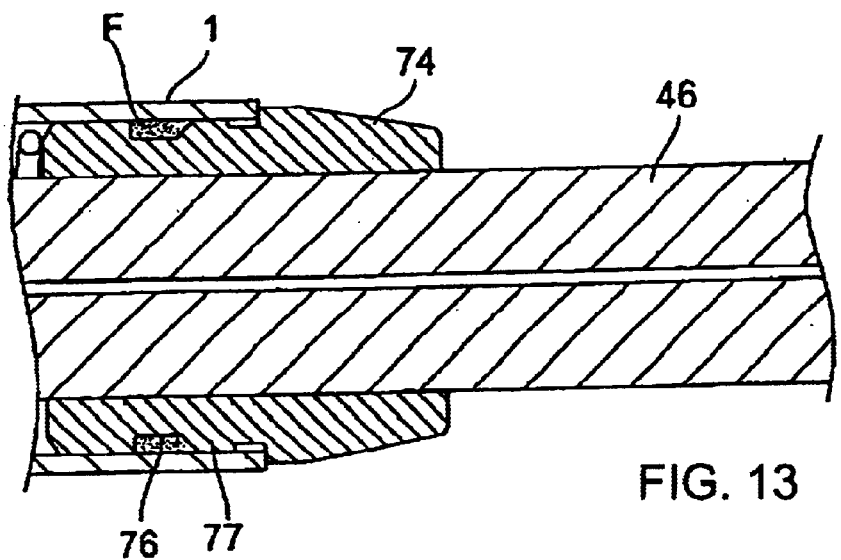
FIG. 13 is a sectional view of a backward part of the displacement sensor of FIG. 8.

As shown in FIGS. 9 and 13, a cable cap 74 integrally formed with a cable 46 is affixed to the back end part of the housing 1. Polyester elastomer may be used for forming the cable cap 74. A groove 76 is formed on the outer periphery of the cable cap 74 in the direction of the circumference for storing an adhesive agent inside. A protrusion 77 is provided for sealing on the bottom surface of the groove 76 in the direction of the circumference.

The cable cap 74 engages with the back part of the housing 1 with the groove 76 filled with an adhesive F as shown in FIG. 13. The protrusion 77 contacts the inner peripheral surface of the back part of the housing 1 so as to seal in the adhesive F inside the groove 76. This serves to provide a dependably watertight structure with improved tensile strength.

As shown in FIG. 9, a linear bush 4, a stopper 5 for preventing rotation, a bobbin assembly 6A, a cable spacer 42 and a bobbin-supporting spring 44 are placed inside the housing in this order.

As shown in FIGS. 9 and 14, the linear bush 4 has an outer tubular body 7 containing therein a tubular ball guide 9 supporting many balls 8 rotatably. The outer tubular body 7 has a tubular main body 7A with a tube-attaching part 10 on the outer circumference which is lower than neighboring parts by one step. At the center of this tube-attaching part 10 is a hole 11 which is a substantially rectangular hole, as shown in FIG. 18, for stopping the rotation of the outer tubular body, elongated in the axial direction of the outer tubular body 7 (indicated by a double-headed arrow). The front and back ends 11a and 11b of the hole 11 are perpendicular to the axial direction of the outer tubular body 7 and the rounded corners of the rectangle of hole 11 have a small radius of curvature. The hole 11 is thus rectangularly formed because if its front and back ends were semicircularly or elliptically formed, the rotation-preventing pin 51A (to be described below) would get stuck against the inner wall, as shown in FIGS. 19A and 19B.

As shown in FIG. 9, a ring-shaped stopper 7B is provided on the inner circumference at the back of the outer tubular body 7. The end cap 12 is pressed into and thereby affixed to the front side of the outer tubular body 7. A sealing groove 13 is formed on the end cap 12 and a back boot holder 14 is provided on the front side of the end cap 12.

Figure 10:
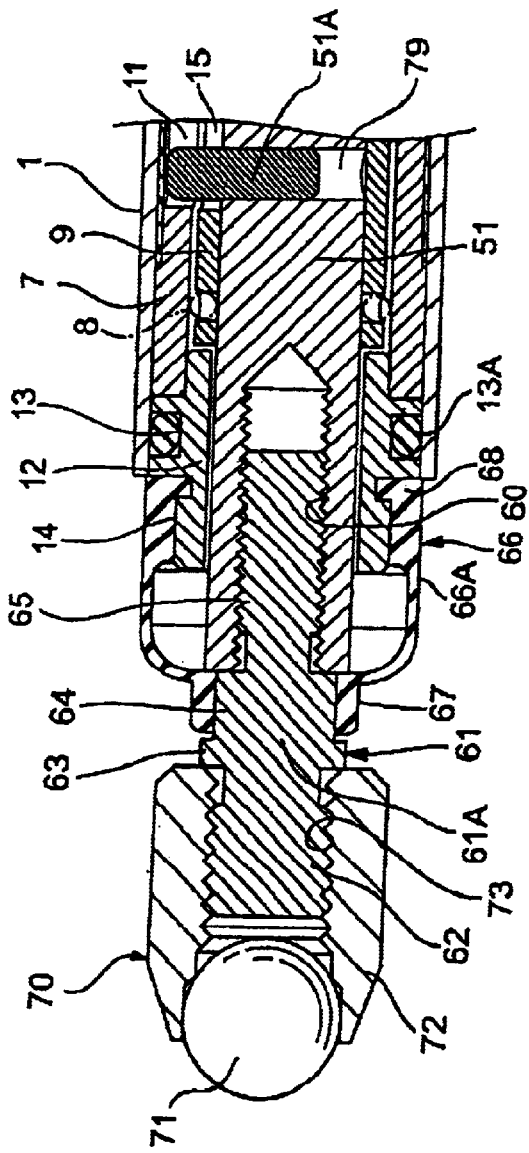
FIG. 10 is a sectional view of a tip part of the displacement sensor of FIG. 8.

As shown in FIG. 10, the ball guide 9 has a hole 15 at a position corresponding to the hole 11 in the outer tubular body 7 when the linear bush 4 is in the assembled condition. These two holes 11 and 15 are formed alike.

Figure 11:
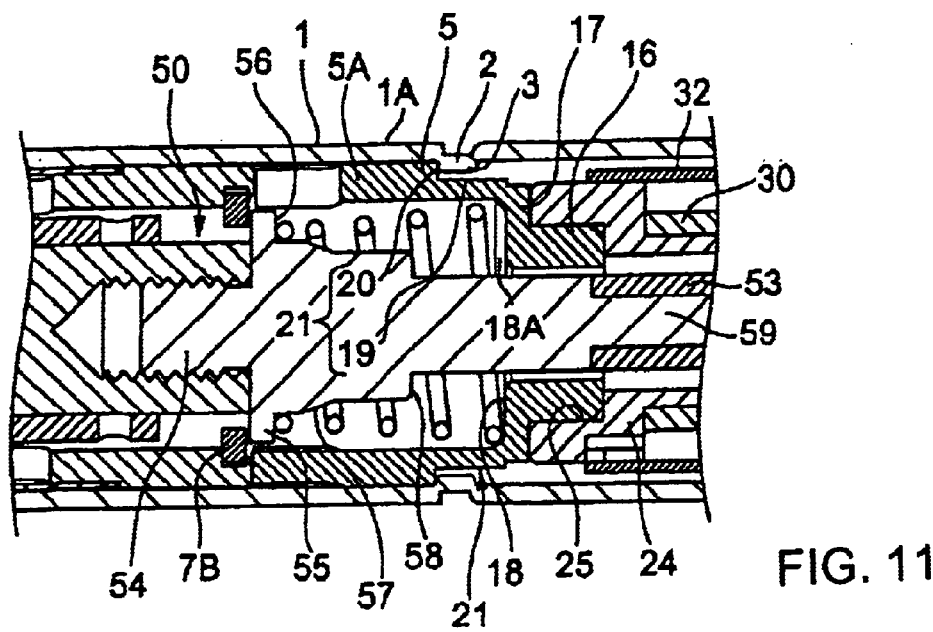
FIG. 11 is a sectional view of a center part of the displacement sensor of FIG. 8.

As shown in FIGS. 9 and 11, the stopper 5 comprises a main body 5A at the back of which is formed a backward end part 16 having a smaller diameter than the main body 5A. The inner surface side of the connecting part 17 between the main body 5A and the backward end part 16 serves as a spring-supporting surface 18 provided with a stopper member 18A. A plurality of flat parts 19 of a stopper 21 are formed on the outer peripheral surface on the backward side of the main body 5A at specified intervals, and a contact surface 20 is formed at the front end of the flat parts 19. When the stopper 5 is inserted into the housing 1, the protrusions 3 of the stoppers 2 are at the positions of these flat parts 19 of the opposite stopper 21 and the contact surfaces 3A and 20 are in a face-to-face relationship so as to position the stopper and to prevent the stopper from turning around.

The bobbin assembly 6A includes bobbin 24. A front shield-engaging part 25 is formed at the front end of the bobbin 24. A back shield-engaging part 26 and a housing-contacting part 27 having a larger diameter than the back shield-engaging part 26 are formed at the back end of the bobbin 24. A groove 28 for leading out a coil line is formed at two places on the back shield-engaging part 26 and the housing-contacting part 27. A partition 29 is formed on the center part of the bobbin 24, and a first coil 30 and a second coils 31 are wound in front of and behind the partition 29. The bobbin 24 is covered with a shield member 32 which is attached to the bobbin 24 with its front end placed over the front shield-engaging part 25 and its back end placed over the back shield-engaging part 26 such that the first and second coils 30 and 31 are covered. The shield member 32 is covered by a bobbin tube 33 made of a thermocontracting synthetic resin film (such as a polyimide film). From the back part of the bobbin 24, first, second and third terminal pins 38, 39 and 40, connected to the connecting parts of the first and second coils 30 and 31 and a terminal at their ends, protrude backward as shown in FIG. 8.

When the bobbin assembly 6A, thus formed, of the differential transformer 6 is contained and fastened inside the housing 1, the bobbin assembly 6A and the housing 1 are in a coaxial relationship. In this situation, the backward end part 16 of the stopper 5 is pushed into the front shield-engaging part 25 of the bobbin 24, the front end of the cable spacer 42 is contacting the back surface of a housing-contacting part 41 at the back of the bobbin 24, and a bobbin-supporting spring 44 is compressed between the back end of this cable spacer 42 and a spring-receiving part 43 at the tip of the cable cap 74 such that the biasing force of this bobbin-supporting spring 44 serves to push the bobbin 24 against the stopper 5 through the cable spacer 42.

Thus, changes in the size of the inner components such as the stopper 5, the bobbin 24 and the cable spacer 42 are absorbed by the bobbin-supporting spring 44, preventing any gap from being generated among these inner components. Thus, the temperature coefficient and the repeatability improve.

The first and second coils 30 and 31 and the shield member 32 are connected to the cable 46 through the wiring pattern on a flexible circuit board 45 positioned on the inner inside of the cable spacer 45.

A conic coil spring 48 and a mobile member 50 provided with a core member 53 are inserted inside the housing 1. As shown in FIGS. 9 and 11, this mobile member 50 has a mobile shaft 51 and a core shaft 52 screwed into a back end part of this mobile shaft 51. A core member 53 is attached to a back part of the core shaft 52. A female screw part 60 and a male screw part 78 are formed respectively at the front end part and the back end p art of the mobile shaft 51 and a pin-accepting hole part 79 is formed radially in the center part of the mobile shaft 51.

Figure 12:
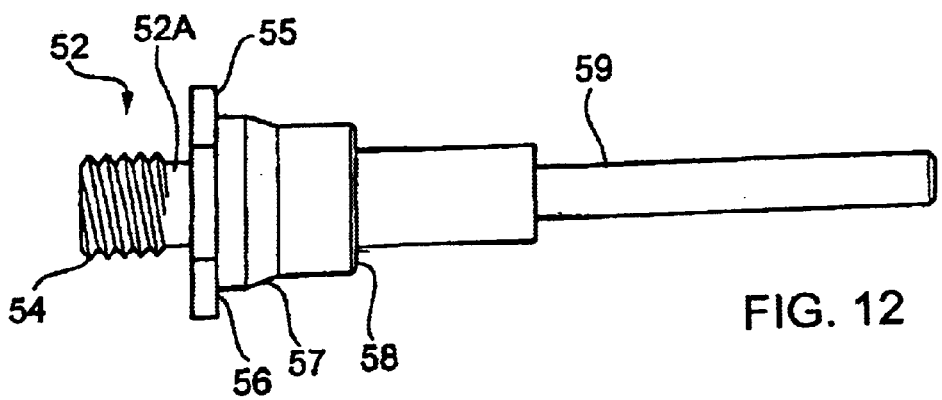
FIG. 12 is a side view of a core shaft of the displacement sensor of FIG. 8.

As shown in FIGS. 11 and 12, the core shaft 52 has a main body 52A on which a male screw part 54, a brim-shaped first stopper part 55, a spring support 56, a tapered part 57, a second stopper part 58 and a holder 59 holding the core member 53 are formed in this order from the front side towards the back.

As shown in FIGS. 9, 10 and 15, a holder 61 for a measuring member 70 has a main body 61A on which an attachment screw part 62, a stopper part 63, a front boot holder 64 and a connecting screw part 65 formed in this order from the front side towards the back. A rubber boot 66 has a main body 66A on the front side of which a front seal part 67 is formed and on the back side of which a back seal part 68 is formed. The measuring member 70 comprises a contact member 71 which is shaped like a ball and a ball holder 72 which supports the contact member 71 rotatably. A female screw part 73 is formed on the ball holder 72.

To assemble the linear bush 4, the ball guide 9 supporting many balls 8 rotatably is placed inside the outer tubular body 7, the rotation-preventing pin (also referred to as the "rotation-preventing member") 51A is inserted into the pin-accepting hole part 79 of the mobile shaft 51 from the side of the hole 11 through the hole 15 of the ball guide 9, and the tube-attaching part 10 of the outer tubular body 7 is covered with the bobbin tube 10A such that the hole 11 is blocked by thermal contraction. As the linear bush 4 is engaged inside the housing 1, its outer tubular body 7 becomes attached to the housing 1 by means of an adhesive agent, and a means for preventing rotation of the mobile part is formed with the holes 11 and 15, the rotation-preventing pin 51A, and the pin-accepting hole part 79.

To assemble the mobile member 50, the male screw part 54 of the core shaft 52 is screwed into the female screw part 78 at the back end part of the mobile shaft 51. A watertight O-ring 13A is provided in the sealing groove 13 formed on outer circumference of the end cap 12 and the linear bush 4 is engaged with and fastened to the housing 1. The watertight ring 13A contacts the inner peripheral surface of the housing 1 to form a reliable watertight contact. The mobile shaft 51 is thus held by the linear bush 4 so as to be movable with respect to the housing 1 in its axial direction. The back end part of the core shaft 52 penetrates the backward end part 16 at the back of the stopper 5, and the core member 53 of the core shaft 52 is inserted into the bobbin 24. The differential transformer 6 is formed with this core member 53 and the aforementioned bobbin assembly 6A of the differential transformer 6.

The stopper 5 is prevented from turning around by engaging the front surface 3A of the protrusion 3 with the contact surface 20 of the stopper 21 to position the stopper 5 with respect to the housing 1 and positioning the protrusions 3 of the housing 1 against the flat parts around the stopper 5. The conic coil spring 48 has its tip part to contact the spring support 56 on the core shaft 52 and its back end part to contact the spring-supporting surface 18 of the stopper 5 so as to push the mobile member 50 forward with its biasing force and to cause the front part of the mobile shaft 51 to protrude forward from the front end of the housing 1.

The mobile member 50, the rubber boot 66 and the measuring member 70 are assembled by firstly engaging the front seal part 67 of the rubber boot 66 to the front boot holder 64 of the holder 61 to thereby attach the holder 61 to the rubber boot 66, as shown by arrow (1) in FIG. 15, and then engaging the connecting screw part 65 of the holder 61 with the female screw part 60 at the front end part of the mobile shaft 51, as shown by arrow (2). The back seal part 68 of the rubber boot 66 is then engaged with the back boot holder 14 of the end cap 12 on the front side of the outer tubular body 7, and the female screw part 73 of the measuring member 70 with the attachment screw part 62 of the holder 61.

Next, the operation of the displacement sensor thus structured will be described.

Figure 22A:
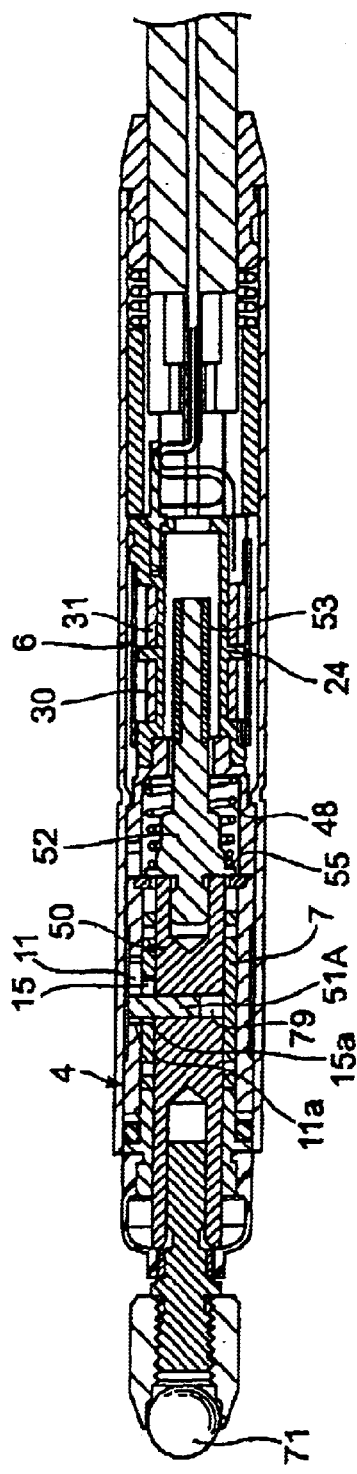
FIGS. 22A is a sectional view of the displacement sensor of this invention when the mobile member is at the stretched limit position, and 22B is a sectional view of the displacement sensor of this invention when the mobile member is at the pushed-in position.

When the displacement sensor is set at a specified position and a mobile target object (not shown) is not contacting the contact member 71 of the sensor (at the "stretched limit position"), the mobile member 50 is pushed by the force of the conic coil spring 48 and the stopper part 55 of the core shaft 52 engages with the stopper 7B on the inner circumference of the outer tubular body 7, as shown in FIG. 22A. In this situation, the rotation-preventing pin 51A does not hit the front end 11a of the hole 11 or the front edge part 15a of a hole 15 shown in FIG. 22A.

When an AC current is supplied to the displacement sensor, currents begin to flow through the first and second coils 30 and 31 by electromagnetic induction. If the core member 53 is at the center and equally over the first and second coils 30 and 31, the absolute values of the voltages generated in the first and second coils 30 and 31 are the same.

Figure 22B:
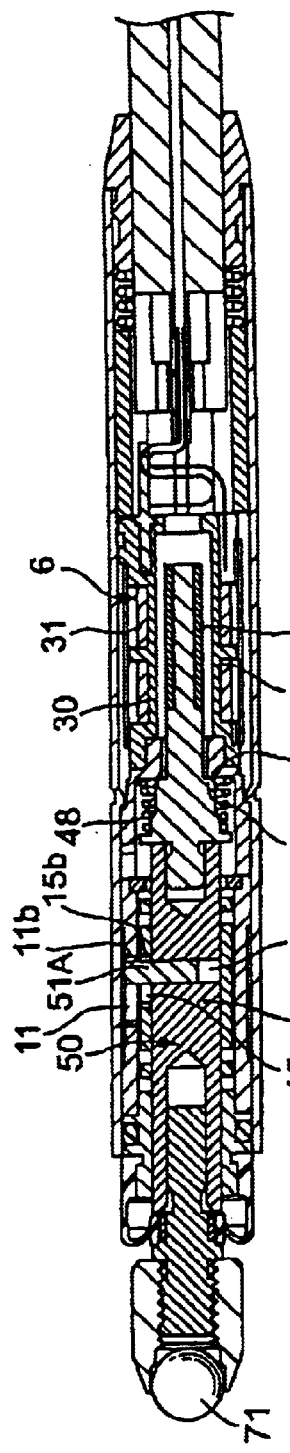
Figure 23:
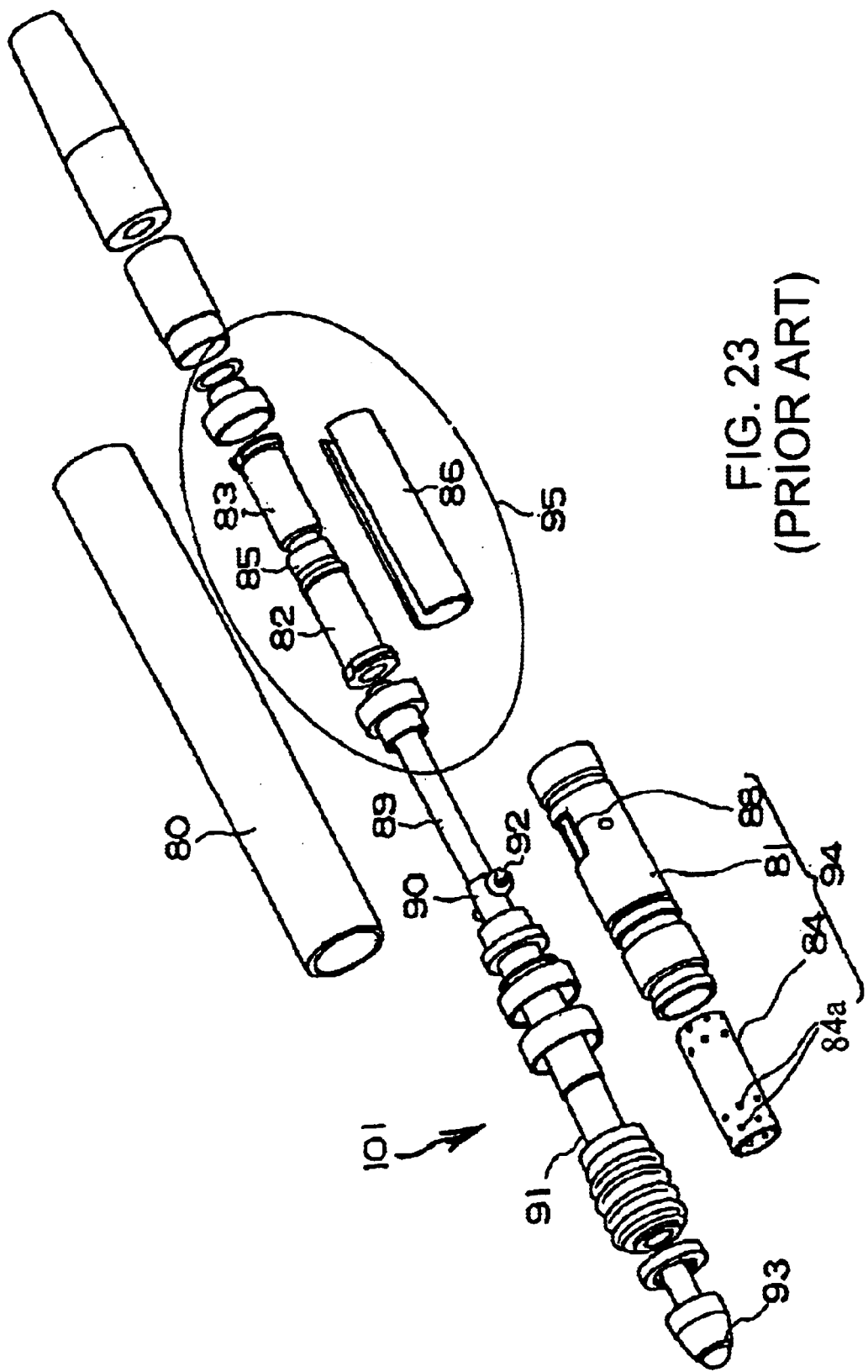
FIG. 23 is an exploded diagonal view of a prior art displacement sensor.
Figure 24A:
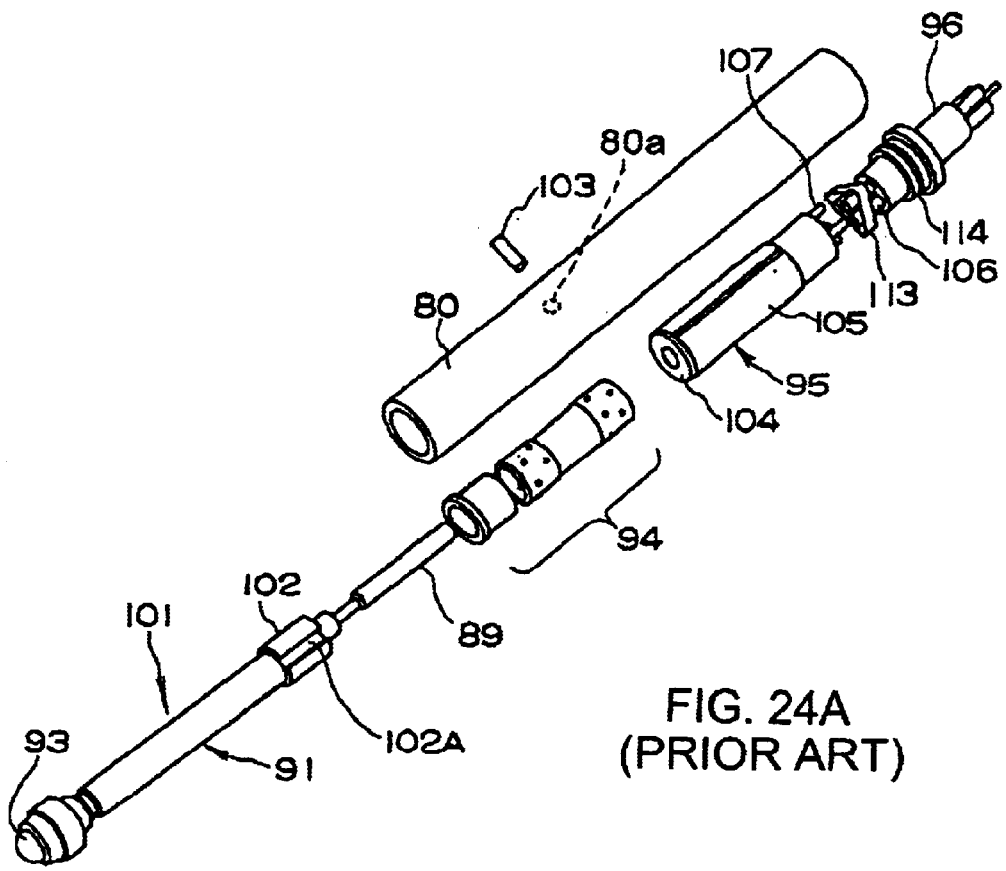
FIG. 24A is an exploded diagonal view of another prior art displacement sensor and FIG. 24B is its sectional view.
Figure 24B:
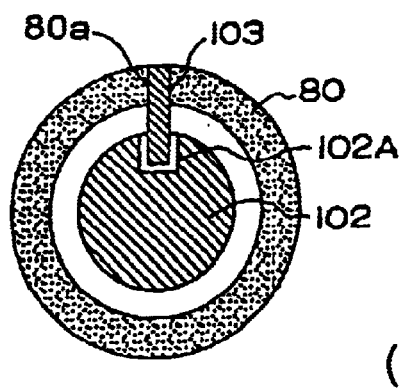

If the target object is displaced, interferes with the contact member 71 of the displacement sensor and pushes in the mobile member 50 against the force of the conic coil spring 48, the core member 53 supported by the mobile member 50 is displaced backward inside the bobbin 24 of the differential transformer 6 from its center position, as shown in FIG. 22B, so as to be inserted more deeply inside the second coil 31. Thus, the voltage induced in the second coil 31 becomes higher and the output voltage changes proportionally to the displacement of the core member 53. The displacement of the target object can be determined by detecting this change in the outputted voltage.

At the farthest pushed-in position, the a second stopper part 58 of the core shaft 52 contacts the stopper member 18A on the spring-supporting surface 18 of the stopper 5. At this moment, the rotation-preventing pin 51A does not hit the back end 11a of the hole 11 or the back edge part 15b of the hole 15. Thus, deformation of the rotation-preventing pin 51A can be prevented, and since this rotation-preventing pin 51A does not become deformed, the core member 53 of the differential transformer 6 is not displaced and the accuracy of detection is improved.

Merits of a displacement sensor thus structured will be explained next.

Firstly, since both the outer tubular body 7 and the ball guide 9 of the linear bush 4 are provided with a hole for preventing rotation (shown at 11 and 15), the mobile shaft 51 is provided with the pin-accepting hole part 79 for the rotation-preventing pin 51A, and the rotation-preventing pin 51A is inserted into these holes 11 and 15 in the direction of motion of the mobile member 50 and further into the pin-accepting hole part 79 so as to form a rotation preventing means, this means for preventing rotation of the mobile member can be placed inside the main body of the sensor and hence the sensor can be made more compact and the main body can be made shorter.

Secondly, since these holes 11 and 15 are rectangularly elongated in the direction of motion of the mobile member 15, the rotation-preventing pin 51A does not get stuck in these holes and the mobile member 15 is allowed to move smoothly.

Thirdly, since the hole 11 is sealed with a thermocontracting resin tube 10A, the adhesive used for attaching the linear bush 4 to the housing 1 is dependably prevented from entering the holes 11 and 15.

Fourthly, since the rotation-preventing pin 51A does not hit the front or back ends of the holes 11 and 15 even when the mobile member 50 is at the "stretch limit position" with the conic coil spring 48 at the fully stretched position or at the farthest pushed-in position, deformation of the rotation-preventing pin 51A can be prevented and the displacement of the core member 53 of the differential transformer 6 can be eliminated.

Fifthly, since the core shaft 52 and the stopper 5 are respectively provided with a spring support 56 and a supporting surface 18 for the conic coil spring 48 and the core shaft 52 is provided with the tapered part 57 to prevent interference with the conic coil spring 48, the conic coil spring 48 is prevented from hitting any neighboring components even if the sensor is made compact and the required force of operation can be reduced.

Sixthly, since the mobile shaft 51 and the holder 61 for the measuring member 70 are separate components, the outer tubular body 7 of the linear bush 4 is provided with the end cap 12 having the back boot holder 14, the holder 61 is provided with the front boot holder 64, the holder 61 is attached to the rubber boot 66 by engaging the front end part of the rubber boot 66 with the front boot holder 64, the holder 61 is connected to the front end part of the mobile shaft 51 and the back end part of the rubber boot 66 is engaged with the back boot holder 14, the interior of the rubber boot 66 can be prevented from being damaged.

Figure 27:
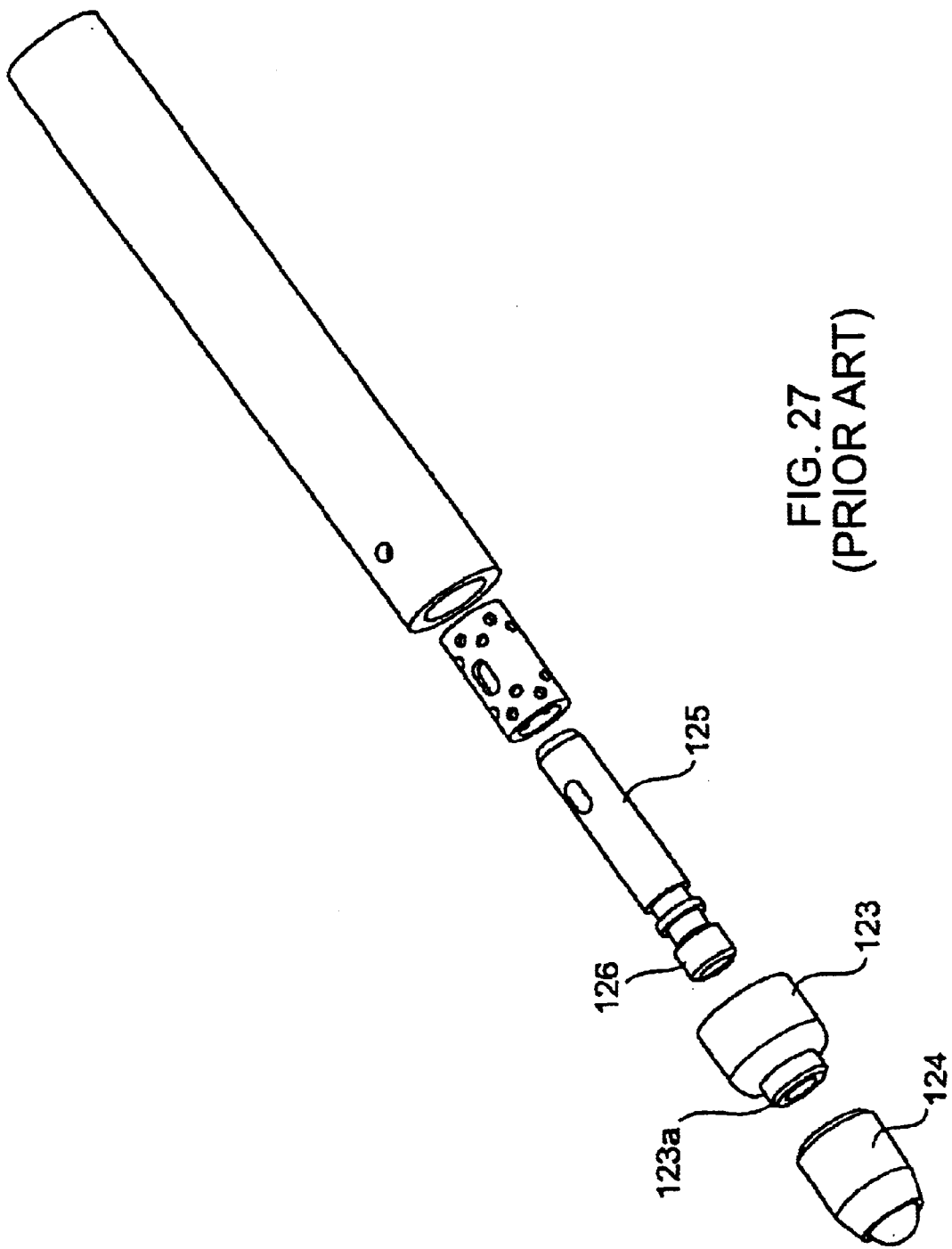
FIG. 27 is a diagonal view of a prior art displacement sensor for showing the assembly of its rubber boot.

FIG. 27 shows a prior art contact displacement sensor for comparison. When this prior art sensor is assembled by engaging a rubber boot 123 onto a mobile shaft 125 from the side of a measuring member 124, the inner seal surface 123a of this rubber boot 123 is damaged by a male screw part 126 on the mobile shaft 125. Thus, a reliable sealed condition cannot be guaranteed with such a prior art sensor.

Figure 20:
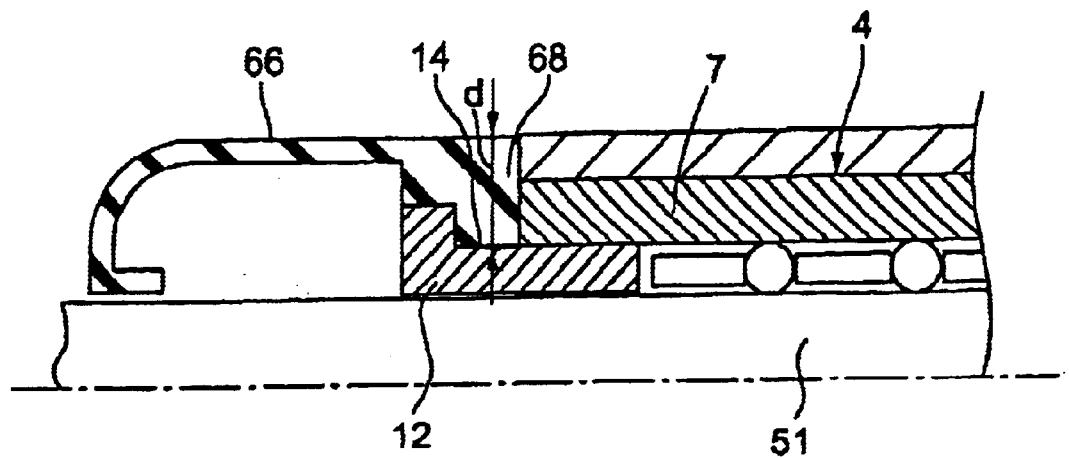
FIG. 20 is a sectional view of a portion of the rubber boot for showing the mechanism for its attachment.
Figure 21:
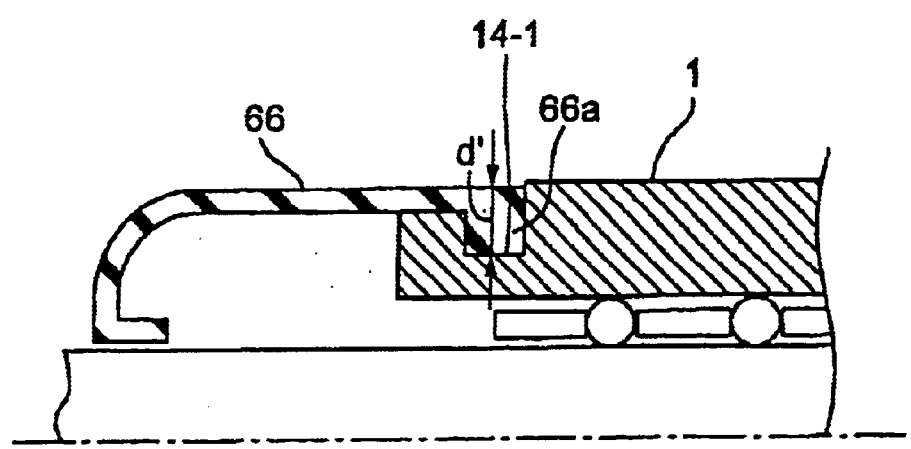
FIG. 21 is a sectional view of a prior art mechanism for attaching a rubber boot.

FIG. 20 shows in detail the end cap 12 provided to the outer tubular body 7 of the linear bush 4 and the back boot holder 14 formed. Thus, the back seal part 68 of the rubber boot 66 can be engaged by this back boot holder 14, and the back seal part 68 can be kept sufficiently thick and a sufficient sealing distance d can be secured for making a dependably waterproofed connection. This is to be contrasted with the corresponding structure of a prior art sensor shown in FIG. 21 with the back boot holder 14-1 formed on the housing 1 such that the sealing distance d' at the back engaging portion 66' of the rubber boot 66 was smaller. Thus, the waterproofing was less dependable.

Further merits of the present invention include the use of the watertight O-ring 13A provided in the sealing groove 13 formed on outer circumference of the end cap 12 such that the linear bush 4 is engaged with and fastened to the housing 1.

Moreover, since the cable cap 74 is integrally formed with a cable 46 with a synthetic resin material and is affixed to the back end part of the housing 1, the cable cap 74 is not a separate component and hence the number of components and the production cost of the sensor can be reduced. The cable 46 can be made more flexible. Since a groove 76 is formed on the outer periphery of the cable cap 74 in the direction of the circumference for storing an adhesive agent inside and a protrusion 77 is provided for sealing on the bottom surface of the groove 76 in the direction of the circumference, an improved waterproofing is effected.

In summary, the present invention provides a compact displacement sensor with a dependably waterproofed structure which can be produced easily and at a reduced cost.

What is claimed is:

1. A contact displacement sensor comprising:
   a housing having inward protrusions with a stopping surface and defining an axial direction;
   a differential transformer of a half bridge type with two coils having a core member;
   a linear bush inside said housing, said linear bush having an outer tubular body with a thermocontracting tube in said axial direction and a holder which is movable in said axial direction;
   a mobile member having a two-stopper part and a mobile shaft supporting said core member of said differential transformer, said mobile member being movable in said axial direction, said mobile shaft having a pin-accepting hole part;
   a contact member at a front end part of said mobile shaft;
   a spring outwardly biasing said mobile member;
   rotation-preventing means for preventing rotation of said mobile member, said rotation-preventing means including a rotation-preventing member, said outer tubular member and said holder each having a hole, said rotation-preventing member being inserted movably in said axial direction into the holes through said outer tubular member and said holder and into said pin-accepting hole part.

2. The displacement sensor of claim 1 wherein said outer tubular member and said holder each have a substantially rectangular hole elongated in said axial direction.

3. The displacement sensor of claim 2 wherein the hole in said outer tubular member is sealed with said thermocontracting tube.

4. The displacement sensor of claim 3 wherein said housing has inward protrusions each with a stopping surface perpendicular to said axial direction; said housing includes a stopper having an outer surface with flat parts and a contact surface which is at one end of said flat parts and is perpendicular to said axial direction; and said protrusions are positioned at said flat parts and said contact surface and said stopping surface contact each other to position said stopper and to prevent rotation of said stopper.

5. The displacement sensor of claim 4 wherein said protrusions are produced by punching said housing inward by a punch-stretch forming method, and grinding outer surface areas of said housing in a centerless grinding process to reduce the thickness of said housing while maintaining a specified distance of protrusion.

6. The displacement sensor of claim 4 wherein
   said housing has a first stopping part and a second stopper part affixed thereto;
   said mobile member has a first stopper part and a second stopper part;
   when said spring is at a stretched limit position with the first stopper of said housing and the first stopper of said mobile member contacting each other, there is a finite interval between said rotation-preventing member and a front end part of said holes; and
   when said spring is at a pushed-in position with the second stopper of said housing and the second stopper of said mobile member contacting each other, there is another finite interval between said rotation-preventing member and a back end part of said holes.

7. The displacement sensor of claim 6 wherein the first stopper part of the housing is formed on said outer tubular body, the second stopper part of the mobile member is formed on said stopper, said mobile shaft includes a core shaft; and the first stopper part and the second stopper part of said mobile member are formed on said core shaft.

8. The displacement sensor of claim 7 wherein said spring is a conic coil spring and is supported between said housing and said core shaft, and said core shaft includes a tapered part for avoiding interference with said conic coil spring.

9. The displacement sensor of claim 1 wherein
   said contact member is supported by a contact-member holder;
   said mobile shaft and said contact-member holder are separate components;
   said outer tubular member is provided with an end cap having a back boot holder;
   said contact-member holder includes a front boot holder;
   a rubber boot has a front end part engaged with said front boot holder and a back end part engaged with said back boot holder, said contact-member holder being thereby attached to said rubber boot, and said contact-member holder being connected to said rubber boot; and
   said rubber boot has a back end part engaged with said back boot holder.

10. The displacement sensor of claim 9 wherein
    said end cap has a groove formed thereon;
    an O-ring is disposed in said groove formed on said end cap, contacting an inner surface of said housing when said linear bushing is attached to said housing.

11. The displacement sensor of claim 1 further comprising a cable cap which is integrally formed with a cable connected to said differential transformer, said cable cap engaging with said housing, said cable being pulled out of a back end part of said housing.

12. The displacement sensor of claim 11 wherein said cable cap has an adhesive-holding groove formed thereon; a sealing protrusion being inside said adhesive-holding groove, said sealing protrusion contacting the inner surface of said housing when said cable cap is engaged to said housing so as to seal in an adhesive inside said adhesive-holding groove.

* * * * *